(12) United States Patent
Miyamoto

(10) Patent No.: US 6,839,071 B1
(45) Date of Patent: Jan. 4, 2005

(54) DATA COMMUNICATION APPARATUS AND METHOD FOR RECEIVING AND DISPLAYING INFORMATION FROM FIRST AND SECOND DEVICES

(75) Inventor: Katsuhiro Miyamoto, Isehara (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/487,313

(22) Filed: Jan. 19, 2000

(30) Foreign Application Priority Data

Jan. 25, 1999 (JP) .............................. 11-015490
Dec. 15, 1999 (JP) .............................. 11-356626

(51) Int. Cl.[7] .............................. G06F 3/00; G06F 3/14
(52) U.S. Cl. ................... 345/788; 345/520; 345/522; 345/717; 345/719; 345/790
(58) Field of Search ..................... 345/501, 520, 345/522, 700, 719, 722, 730, 732, 764, 765, 788, 790, 793, 794, 797, 798

(56) References Cited

U.S. PATENT DOCUMENTS

| | | | |
|---|---|---|---|
| 5,353,041 A | | 10/1994 | Miyamoto et al. ............ 345/97 |
| 5,420,603 A | | 5/1995 | Tsuboyama et al. .......... 345/87 |
| 5,657,221 A | * | 8/1997 | Warman et al. ......... 345/764 X |
| 5,731,844 A | * | 3/1998 | Rauch et al. ........... 345/700 X |
| 5,748,174 A | * | 5/1998 | Wong et al. ................. 345/798 |
| 5,796,402 A | * | 8/1998 | Ellison-Taylor ............. 345/792 |
| 5,815,135 A | | 9/1998 | Yui et al. ....................... 345/97 |
| 5,859,639 A | * | 1/1999 | Ebrahim ..................... 345/788 |
| 5,912,713 A | | 6/1999 | Tsunoda et al. ............. 348/540 |
| 6,005,559 A | | 12/1999 | Miyamoto .................. 345/212 |
| 6,108,014 A | * | 8/2000 | Dye ....................... 345/501 X |
| 6,229,524 B1 | * | 5/2001 | Chernock et al. ....... 345/719 X |
| 6,348,932 B1 | * | 2/2002 | Nishikawa et al. ......... 345/719 |

FOREIGN PATENT DOCUMENTS

| | | |
|---|---|---|
| JP | 8-125993 | 5/1996 |
| KR | 96-700491 | 1/1996 |

* cited by examiner

*Primary Examiner*—John Cabeca
*Assistant Examiner*—X. L. Bautista
(74) *Attorney, Agent, or Firm*—Fitzpatrick, Cella, Harper & Scinto

(57) ABSTRACT

A receiving apparatus and method receives first display information from a first device and receives second display information and control information from a second device. A display unit displays the first display information and the second display information on a display unit, and a control unit generates control information for minimizing overlay of the first display information and the second information. Control information is received from the control unit and, before receiving the second display information, the control information is sent to the second device.

12 Claims, 19 Drawing Sheets

| MODE | NAME | DESCRIPTION |
|---|---|---|
| 0 | FREE | INITIAL STATE |
| 1 |  | RESERVED |
| 2 | SUSPENDED | SUSPENDED-FRAME TRANSFER |
| 3 | — | RESERVED |
| 4 | RESUME | RESUMED-FRAME TRANSFER |
| 5 | SEND | SEGMENT BUFFER EFFECTIVE |
| 6 | — | RESERVED |
| 7 | — | RESERVED |

FIG.11

| MODE | NAME | DESCRIPTION |
|---|---|---|
| 0 | FREE | INITIAL STATE |
| 1 | MORE | NOT LAST FRAME |
| 2 | SUSPENDED | SUSPENDED-FRAME TRANSFER |
| 3 | — | RESERVED |
| 4 | LAST | FRAME TRANSFER SUCCEED, AND NEXT FRAME BELONGS TO ANOTHER GROUP |
| 5 | LESS | FRAME HAVING SHORTENED LENGTH TRANSFERRED |
| 6 | — | RESERVED |
| 7 | — | RESERVED |

FIG.12

| TYPE | |
|---|---|
| 0 | RESERVED |
| 1 | SET_OSD_PIXEL_FORMAT |
| 2 | 4_BIT_OSD_DATA |
| 3 | 8_BIT_OSD_DATA |
| 4 | UNCOMPRESSED_16_BIT_DATA |
| 5 | FILL_REGION_WITH_CONSTANT |
| 6 | CLEAR_OSD |
| 7 | DRAWING-LAYOUT INFORMATION |
| 8 | DRAWING CONDITIONS |
| 8-255 | RESERVED FOR FUTURE USE |

FIG.14

| CTS | DESCRIPTION |
|---|---|
| 0000 | AV/C |
| 0001 | RESERVED FOR CAL |
| 0010 | RESERVED FOR EHS |
| 0011 ⋮ 1101 | RESERVED |
| 1110 | VENDOR UNIQUE |
| 1111 | EXTENDED CTS |

| VALUE | COMMANED TYPE |
|---|---|
| 0 | CONTROL |
| 1 | STATUS |
| 2 | SPECIFIC INQUIRY |
| 3 | NOTIFY |
| 4 | GENERAL INQUIRY |
| 5-7 | RESERVED FOR FUTURE SPEC. |
| 8 | USED BY RESPONSE CODES |

FIG.22

| VALUE | COMMANED TYPE |
|---|---|
| 0-7 | USED BY COMMAND TYPE |
| 8 | NOT INPLEMENTED |
| 9 | ACCEPTED |
| A | REJECTED |
| B | IN TRANSMISSION |
| C | INPLEMENTED/STABLE |
| D | CHANGED |
| E | RESERVED FOR FUTURE SPEC. |
| F | INTERIM |

FIG.23

DATA COMMUNICATION APPARATUS AND METHOD FOR RECEIVING AND DISPLAYING INFORMATION FROM FIRST AND SECOND DEVICES

BACKGROUND OF THE INVENTION

1. Field of the Invention

The present invention relates to a data communication apparatus and method, and a storage medium capable of being read by a computer. More particularly, the invention relates to a technique of drawing, in a network including a plurality of information supply sources and at least one display device, display information possessed by each of the information supply sources on the at least one display device.

2. Description of the Related Art

Currently, various associations have started their activities for realizing a home network where AV (audio visual) apparatuses and a digital television receiver (hereinafter abbreviated as a. "digital TV") in a home are interconnected. For example, an association called the 1394 TA (Trade Association) is planning specifications for transport layers based on the IEEE (Institute of Electrical and Electronics Engineers, Inc.) 1394-1995 Standards in order to interconnect a plurality of AV apparatuses including a digital TV with a common digital interface.

Recently, mainly Western countries intend to put digital television broadcasting to practical use. Digital television broadcasting has a capability of simultaneously transferring a plurality of programs with the same bandwidth as the conventional analog TV broadcasting bandwidth.

Particularly, digital television broadcasting can perform broadcasting using digital data. Hence, it is possible to broadcast still images, representing EPGs (electronic programming guides), commercial information, weather information, stock information and the like, together with digital image information and digital sound information. Such digital television broadcasting containing digital information is transferred to and displayed on each digital TV connected to a home network via a set-top box or the like.

It is considered that in a future home network, each display device, such as a digital TV or the like, is connected not only to a dedicated set-top box, but also to other AV apparatuses via a common digital interface.

In such a case, the display device must have the function of displaying display information (hereinafter termed an OSD (on-screen display)) possessed by each AV apparatus on the same picture surface. Particularly when a plurality of AV apparatuses share a single display device, there is the possibility that an OSD (such as a still image or a graphic image) of each AV apparatus simultaneously provides the display device with a request to draw an image during a certain time period. In such a case, the display device must display a plurality of OSDs on the display picture surface so that they overlap with each other as little as possible, or overlap with each other in a state of not causing any problems.

However, since OSDs of respective AV apparatuses are usually transmitted irrespective of layout on the display picture surface of the display device, the display device must process how to layout a plurality of OSDs on the display picture surface. Such a configuration causes a very large burden on the display device, and is not efficient.

SUMMARY OF THE INVENTION

An object of the present invention is to solve the above-described problems.

Another object of the present invention is to realize, in an information communication apparatus, method and system, a technique to reduce the burden on a display device for displaying display information possessed by each information supply source and efficiently display display information of each information supply source.

According to one aspect of the present invention, an information communication apparatus includes input means for inputting information relating to display information to be displayed on a display device controlled by an external apparatus, generation means for generating control information for controlling processing for displaying the display information of the information communication apparatus on the display device, and output means for outputting the display information and the control information.

According to another aspect of the present invention, an information communication method includes the steps of inputting information relating to display information to be displayed on a display device controlled by an external apparatus, generating control information for controlling processing for displaying the display information of an information communication apparatus on the display device, and outputting the display information and the control information.

According to still another aspect of the present invention, an information communication apparatus includes output means for outputting information relating to display information to be displayed on a display device to an external apparatus, input means for inputting the display information of the external apparatus and control information for controlling processing for displaying the display information on the display device, and control means for controlling the processing for displaying the display information on the display device based on the control information.

According to yet another aspect of the present invention, an information communication method includes the steps of outputting information relating to display information to be displayed on a display device to an external apparatus, inputting the display information of the external apparatus and control information for controlling processing for displaying the display information on the display device, and controlling the processing for displaying the display information on the display device based on the control information.

According to yet a further aspect of the present invention, an information communication system includes a first apparatus and a second apparatus. The first apparatus includes input means for inputting information relating to display information to be displayed on a display device controlled by the second apparatus, generation means for generating control information for controlling processing for displaying the display information of the first apparatus on the display device, and output means for outputting the display information and the control information. The second apparatus includes output means for outputting the information relating to the display information to be displayed on the display device to the first apparatus, input means for inputting the display information of the first apparatus and the control information of the first apparatus, and control means for controlling the processing for displaying the display information of the first apparatus on the display device based on the control information of the first apparatus.

According to still another aspect of the present invention, an information communication method includes the steps of inputting information relating to display information to be displayed on a display device controlled by a second apparatus, which is output from a first apparatus, generating control information for controlling processing for displaying the display information of the first apparatus on the display device, outputting the display information of the first apparatus and the control information of the first apparatus, from the first apparatus, inputting the display information of the first apparatus and the control information of the first apparatus, and controlling the processing for displaying the display information of the first apparatus on the display device, based on the control information of the first apparatus.

Still other objects of the present invention, and the advantages thereof, will become fully apparent from the following detailed description of the embodiment.

BRIEF DESCRIPTION OF THE DRAWINGS

FIG. 11 is a diagram illustrating the types of modes set in a mode field of producer_count 1102;

FIG. 12 is a diagram illustrating the types of modes set in a mode field of limit_count 1001;

FIG. 14 is a diagram illustrating the types of type_codes;

FIG. 22 is a diagram illustrating the types of "ctype"s; and

FIG. 23 is a diagram illustrating the types of response codes.

DESCRIPTION OF THE PREFERRED EMBODIMENT

The preferred embodiment of the present invention will now be described in detail hereinafter with reference to the accompanying drawings.

Figure 1:
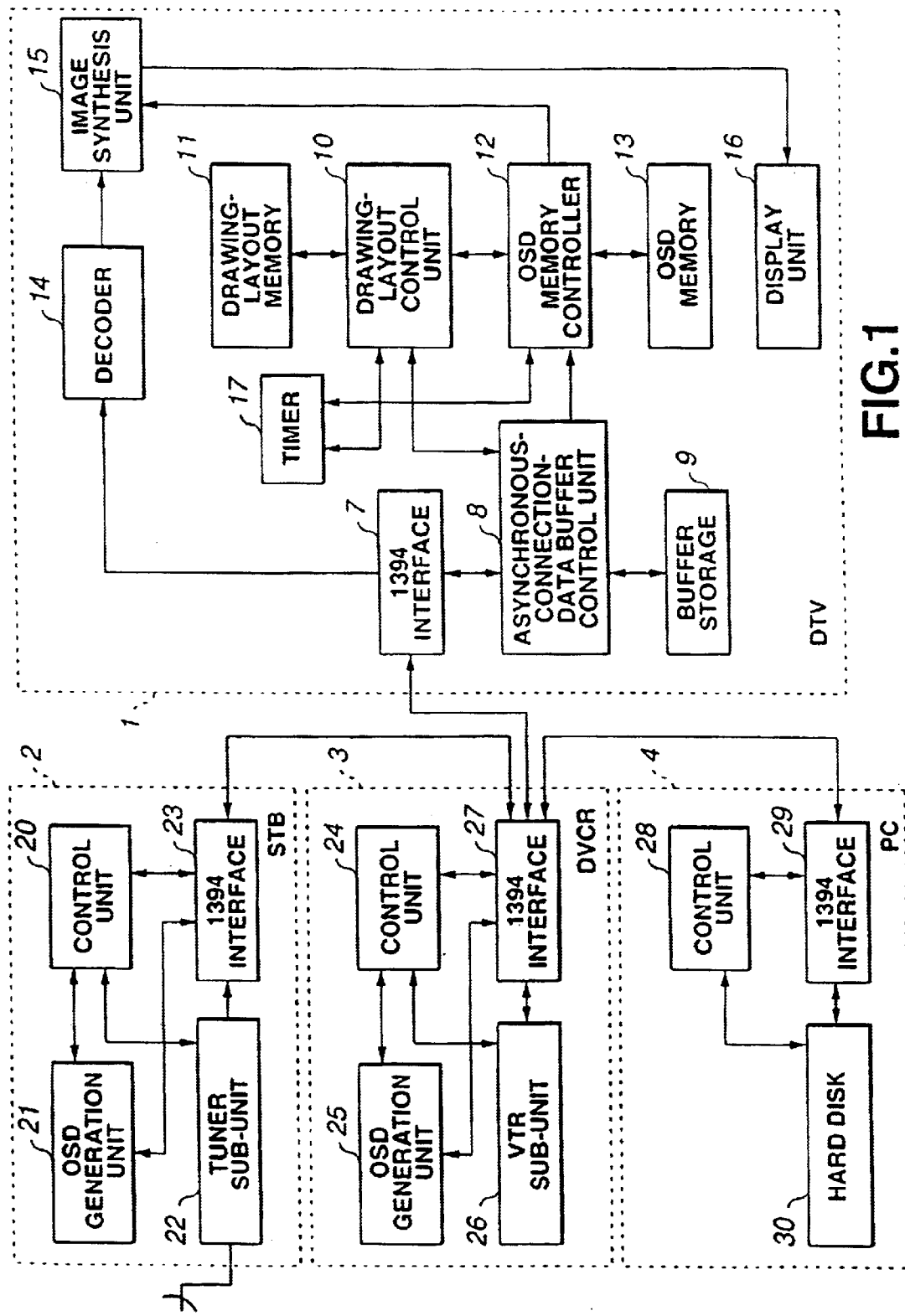
FIG. 1 is a block diagram illustrating a data communication system according to a preferred embodiment of the present invention.

FIG. 1 is a home network including four AV apparatuses according to the embodiment. The AV apparatuses of the embodiment are interconnected via a 1394 serial bus interface conforming to the IEEE 1394-1995 Standards and extended standards thereof (hereinafter termed an "IEEE 1394 interface"), serving as a next-generation high-performance digital interface.

The IEEE 1394 interface has the following features.

(1) The data transfer rate is high.

(2) A real-time data transfer mode (i.e., an isochronous transfer mode) and an asynchronous transfer mode are supported.

(3) A connection configuration (topology) having a high degree of freedom can be constructed.

(4) A plug-and-play function and an active-line insertion/extraction function are supported.

Figure 2:
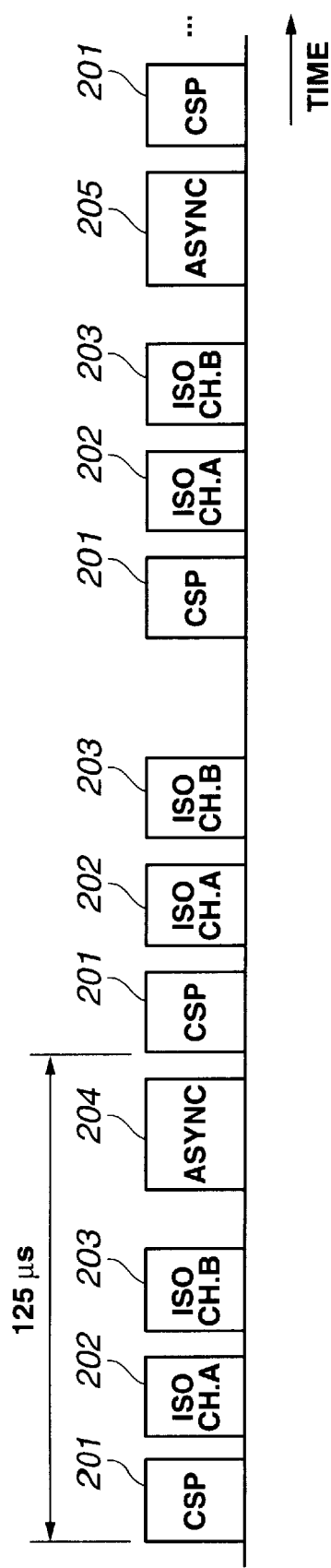
FIG. 2 is a diagram illustrating an isochronous transfer mode and an asynchronous transfer mode.

FIG. 2 is a diagram illustrating the operations of the isochronous transfer mode and the asynchronous transfer mode.

The isochronous transfer mode is a transfer method of guaranteeing a transfer band for a predetermined period in each communication cycle period. Accordingly, the isochronous transfer mode is effective for data transfer in which it is requested to continuously transfer a predetermined amount of data with a constant data rate (such as moving image data, sound data or the like).

In the asynchronous transfer mode, data capable of being asynchronously transferred if necessary (such as a control command, file data or the like) is transferred to an assigned apparatus. In the asynchronous transfer mode, three types of transactions, i.e., a reading transaction, a writing transaction and a locking transaction, are provided. In the asynchronous transfer mode, it is possible to transmit the fact that a receiving operation has been performed, and to perform securer communication than in the isochronous transfer mode.

It is possible to mix the isochronous transfer mode and the asynchronous transfer mode in each communication cycle (usually, one communication cycle is 125 µs). As shown in FIG. 2, each transfer mode is executed after transferring a cycle start packet (hereinafter abbreviated as a "CSP") 201 indicating start of each communication cycle.

In FIG. 2, reference numerals 202 and 203 represent communication packets (isochronous packets) transferred at each communication cycle based on the isochronous transfer mode. Reference numerals 204 and 205 represent communication packets (asynchronous packets) transferred based on the asynchronous transfer mode.

In each communication cycle period, the isochronous transfer mode is set to a higher order of priority than the asynchronous transfer mode. The transfer band of the isochronous transfer mode is guaranteed within each communication cycle.

Next, the home network shown in FIG. 1 will be described in detail.

In FIG. 1, reference numeral 1 represents a digital television (hereinafter abbreviated as a "DTV"). The DTV 1 has the function of receiving display information (hereinafter termed "OSD data") transferred from at least one AV apparatus connected to the network, and drawing a corresponding image on a display device provided in the DTV 1. The OSD data represents a still image, a still image having a moving portion (such as still-image data including animation), 3D graphics, a text, a moving image, or display information where at least one of these images are mixed.

The OSD data includes display information called a control panel in addition to display information relating to EPGs, commercial information, weather information, stock information or the like. The control panel is display information for performing a remote operation of an AV apparatus having the control panel. The control panel is a GUI (graphic user interface) including at least one element (each element being displayed in the form of a text or graphics), and each element displays functions of the AV apparatus which can be subjected to remote control. By operating an element within a control panel drawn on the display device of the DTV 1 or the like, the user can perform a remote operation of an AV apparatus corresponding to the control panel. For example, the control panel of a digital video cassette recorder 3 (to be described later) has elements corresponding to functions, such as "recording", "reproduction", "rapid feeding", "rewinding", "temporary stop", "forward-portion skipping", "rear-portion skipping" and the like. When intending to make the digital video cassette recorder 3 in the state of "temporary stop" using this control panel, it is only necessary to select and determine an element corresponding to "temporary stop". Information relating to an element operated by the user is notified from the display device of the DTV 1 or the like to the digital video cassette recorder 3.

Reference numeral 2 represents a set-top box (hereinafter abbreviated as an STB"). The STB can convert an MPEG (Moving Picture Experts Group)2 TS (transport stream) based on the MPEG2 standards, various OSD data, control commands and the like into data for an IEEE 1394 interface, and output the resultant data. The MPEG2 TS is obtained by dividing a plurality of image data, sound data and auxiliary data thereof into packets (in units of 188 bytes) in a multiplexed state.

In the STB 2, a control unit 20 controls the operation of the STB 2, and changes drawing conditions for OSD data generated by an OSD generation unit 21 if necessary. The OSD generation unit 21 generates OSD data, such as EPGs, the number of a tuned channel, commercial information, a control panel and the like. The OSD generation unit 21 also generates reference drawing conditions for various OSD data, and changes the drawing conditions based on drawing-layout information (to be described later). A tuner sub-unit 22 has the function of receiving an MPEG TS for digital broadcasting. A 1394 interface 23 transfers OSD data to the DTV 1 based on an Asynchronous Connection Protocol (to be described later).

Reference numeral 3 represents a digital video cassette recorder (hereinafter abbreviated as a "DVCR"). The DVCR 3 can record moving-image data (including an MPEG2 TS) subjected to isochronous transfer from the STB 2, and reproduce the recorded moving-image data (including the MPEG2 TS) and perform isochronous transfer of the reproduced data to the DTV 1.

A control unit 24 of the DVCR 3 controls the operation of the DVCR 3, and changes drawing conditions for OSD data generated by the OSD generation unit 25 if necessary. The OSD generation unit 25 generates a control panel for instructing recording, reproduction, temporary stop, special reproduction and the like, and display information for notifying the current operating state, the remaining recording amount of a recording medium, a recording time, a reproducing time and the like, as OSD data. The OSD generation unit 25 also generates drawing conditions for respective OSD data output from the DVCR 3, and changes these reference drawing conditions based on drawing-layout information (to be described later). A VCR sub-unit 26 has the function of recording/reproducing moving-image data in the MPEG2 format on/from a recording medium, such as a magnetic tape, a magnetic disk or the like. A 1394 interface 27 transfers OSD data of the DVCR 3 to the DTV 1 based on the "Asynchronous Connection Protocol".

Reference numeral 4 represents a personal computer (hereinafter abbreviated as a "PC"). The PC 4 transfers OSD data stored in a hard disk 30 to the DTV 1. A 1394 interface 24 transfers OSD data of the PC 4 to the DTV 1 based on the "Asynchronous Connection Protocol". A control unit 28 of the PC 4 generates reference drawing conditions for each OSD data output from the PC 4, and changes these drawing conditions based on drawing-layout information.

Next, the internal configuration of the DTV 1 will be described in detail.

Reference numeral 7 represents an IEEE 1394 interface having the above-described functions. The IEEE 1394 interface has the function of a physical layer and the function of a link layer conforming to the IEEE 1394-1995 standards and expanded standards thereof. The IEEE 1394 interface 7 also has a function conforming to "AV/C digital interface command set specifications" (to be described later) and a communication function conforming to the "Asynchronous Connection Protocol". 1394 interfaces 23, 27 and 29 provided in the STB 2, the DVCR 3 and the PC 4, respectively, have the same functions as the IEEE 1394 interface 7.

Reference numeral 8 represents a data buffering control unit for the Asynchronous Connection Protocol. The data buffering control unit 8 controls buffering for an OSD frame transferred for each predetermined data unit based on the Asynchronous Connection Protocol. The data format of the OSD frame in this embodiment will be described later. A buffer storage 9 buffers the OSD frame.

A drawing-layout control unit 10 controls drawing-layout information. The drawing-layout information includes drawing conditions, layout IDs and the like of a plurality of OSD data currently displayed by the DTV 1. A drawing-layout memory 11 stores the drawing-layout information controlled by the drawing-layout control unit 10.

An OSD memory controller 12 performs control so as to draw a plurality of OSD data transferred based on the Asynchronous Connection Protocol based on drawing conditions corresponding to the respective OSD data. An OSD memory 13 stores the plurality of OSD data and drawing conditions corresponding to the respective OSD data so as to correspond to each other.

A decoder 14 decodes an MPEG2 TS subjected to isochronous transfer from each apparatus (the STB 1 or DVCR 3), and converts the decoded data into a standard television signal (according to the NTSC (National Television System Committee) method, the PAL (Phase Alternation by Line) method or the like). An image synthesis unit 15 synthesizes the standard television signal and OSD data on the same picture surface. The image synthesis unit 15 includes a plurality of planes (including a plurality of planes for OSD data and a plurality of planes for standard television signals). The image synthesis unit 15 performs switching and synthesis of display information to be displayed, using each of the planes.

A display unit 16 comprises a display device, such as a CRT (cathode-ray tube), a liquid-crystal monitor or the like, and displays image data generated by the image synthesis unit 15. A timer 17 measures a drawing period of each OSD data drawn on the display picture surface of the display unit 16.

Figure 3:
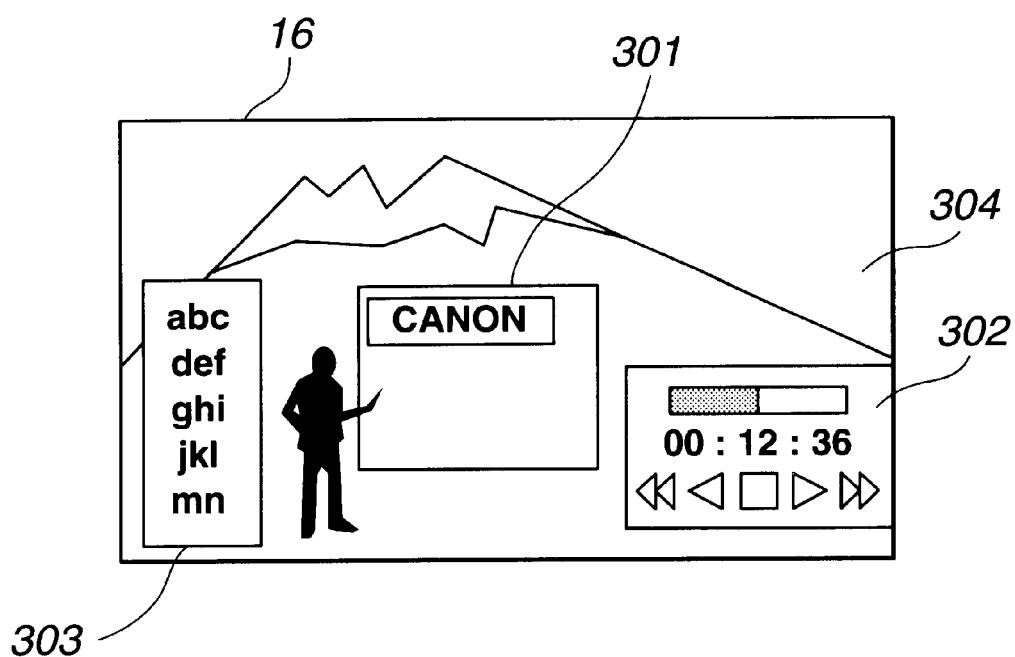
FIG. 3 is a diagram illustrating a display picture surface of a digital television apparatus.

FIG. 3 is a diagram illustrating a display picture surface of the DTV 1 of this embodiment.

In FIG. 3, a region 301 displays OSD data transferred from the STB 2 (such as a still image for commercial). A region 302 displays OSD data of the DVCR 3 (such as the above-described control panel for performing remote control of the DVCR 3 and displaying the remaining amount of reproduction/recording, the recording time and the like). A region 303 displays OSD data provided in the PC 4 (such as bit-map-image data). A main picture surface 304 displays an MPEG TS subjected to isochronous transfer from the STB 2.

Each OSD data is drawn on the display picture surface according to the following drawing procedure.

Explanation of the Drawing Procedure

Next, a description will be provided of a procedure in which an apparatus connected to the home network of the embodiment draws OSD data of the apparatus on the display picture surface of the DTV 1.

Figure 4:
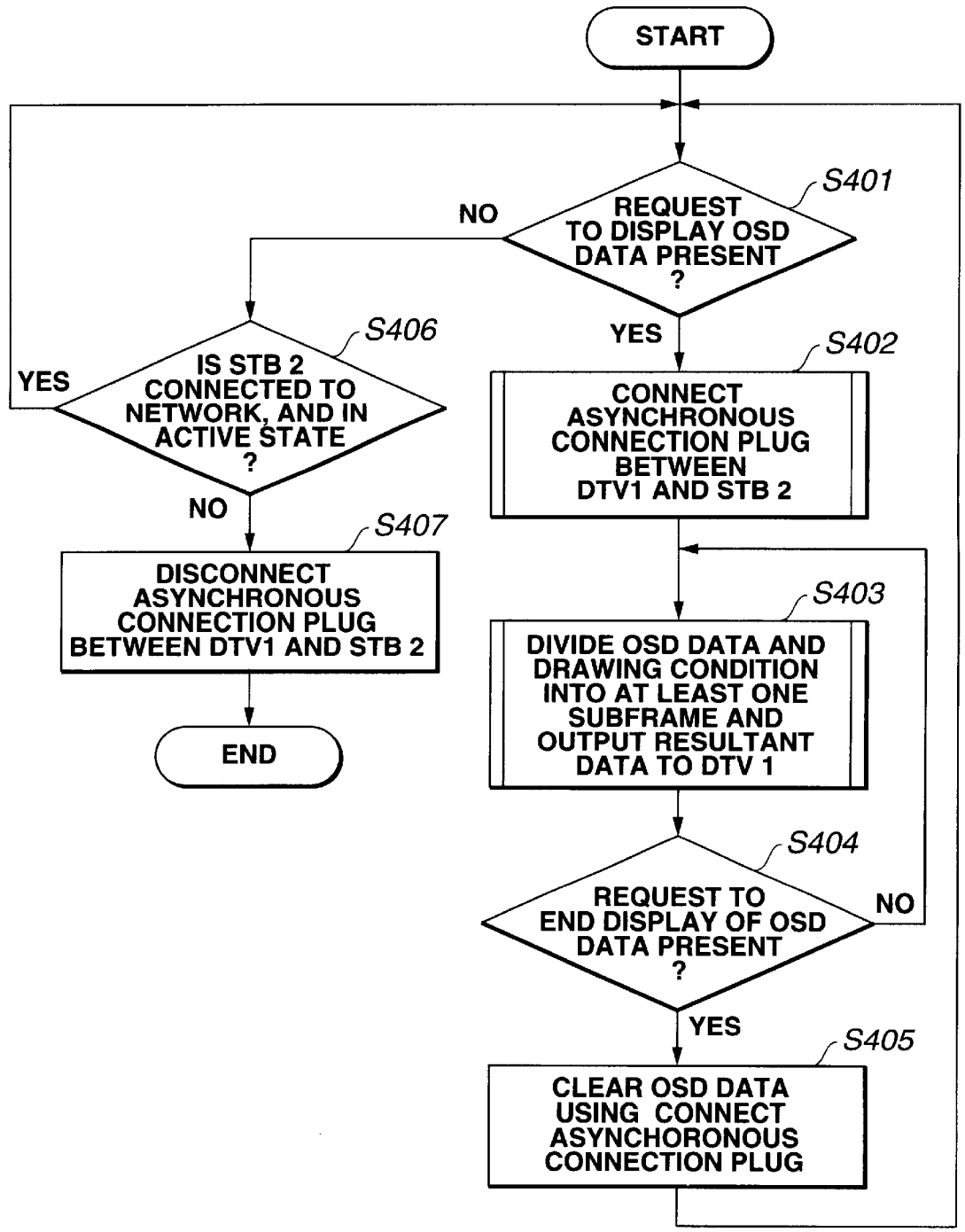
FIG. 4 is a diagram illustrating a procedure for drawing an image.

A procedure for drawing OSD data of the STB 2 (for example, still-image data 301 for commercial received from the outside) on the display picture surface of the DTV 1 will now be described in detail with reference to FIG. 4.

In step S401, the STB 2 receives the still-image data 301 for commercial from an external broadcasting station, and determines if there is a request to draw the still-image data 301 on the DTV 1. If the result of the determination in step S401 is affirmative, the STB 2 generates OSD data corresponding to the still-image data 301 using the OSD generation unit 21. The DTV 1 outputs a request to start display of the OSD data.

The OSD generation unit 21 also generates drawing conditions requested for the OSD data. In this embodiment, the drawing conditions are also called display conditions, and include at least one set of control information for controlling display of the OSD data. Such control information controls, for example, the position for displaying the OSD data (hereinafter termed a "drawing position"), the size of the image to be displayed (hereinafter termed a "drawing size"), conditions for overlay (hereinafter termed "overlay conditions"), the order of overlay (hereinafter termed an "overlay order"), the period of display (hereinafter termed a "drawing period"), the type of the OSD data (hereinafter termed a "type of drawing"), the time to start drawing (hereinafter termed a "drawing start time"), a period allowed for overlay (hereinafter termed an "allowable period for overlay"), or the like.

In step S402, an IEEE 1394 interface 23 of the STB 2 sets an asynchronous connection plug between the IEEE 1394 interface 23 and the IEEE 1394 interface 7 of the DTV 1. The STB 2 transfers the OSD data to the DTV 1 via the asynchronous connection plug.

The asynchronous connection plug is a virtual input/output plug set based on the Asynchronous Connection Protocol. By setting this plug, a logical (or virtual) connection relationship between a source node and a destination node is provided. A connection procedure for the asynchronous connection plug will be described later.

In step S403, the STB 2 constitutes an OSD frame provided by this embodiment using the OSD data, the drawing conditions and other additional information. The data format of the OSD frame includes at least one subframe. The STB 2 generates asynchronous packets in units of a subframe, and performs sequential asynchronous transfer of the generated packets to the DTV 1 via the asynchronous connection plug.

The transfer procedure between the STB 2 and the DTV 1 will be described in detail with reference to FIGS. 5 or 6.

In step S404, the STB 2 determines if a request to end drawing of the OSD data is present. The DTV 1 outputs a request to end display of the OSD data.

If the result of the determination in step S404 is affirmative, the process proceeds to step S405, where the STB 2 transfers a control command for clearing the OSD data drawn on the display picture surface to the DTV 1 based on the Asynchronous Connection Protocol.

The STB 2 again executes the processing of step S401, and determines if a request to draw another OSD data is present. At that time, the STB 2 maintains the asynchronous connection plug which has been connected in the connected state.

In step S406, the STB 2 determines if the STB 2 is connected to the network and in an active state.

If the result of the determination in step S406 is negative, i.e., when the STB 2 is not physically connected to the network, or in an nonoperating state (i.e., inactive state) because the main power supply is in an off-state even if the STB is connected to the network, the STB 2 performs the processing of step S407. In step S407, the STB 2 releases the asynchronous connection plug to provide a noncontact state.

According to the above-described procedure, it is possible to efficiently display OSD data of one apparatus while reducing the load on the display device. This procedure can also be executed in parallel for respective OSD data. Accordingly, even when displaying OSD data from different apparatuses, or when displaying a plurality of OSD data from one apparatus, the OSD data can be efficiently displayed while reducing the load on each apparatus. As a result, a single apparatus can display a plurality of OSD data at different positions, or in a state of being superposed.

Explanation of the Transfer Procedure

Next, an example of the transfer procedure in step S403 shown in FIG. 4 will be described in detail with reference to FIG. 5.

Figure 5:
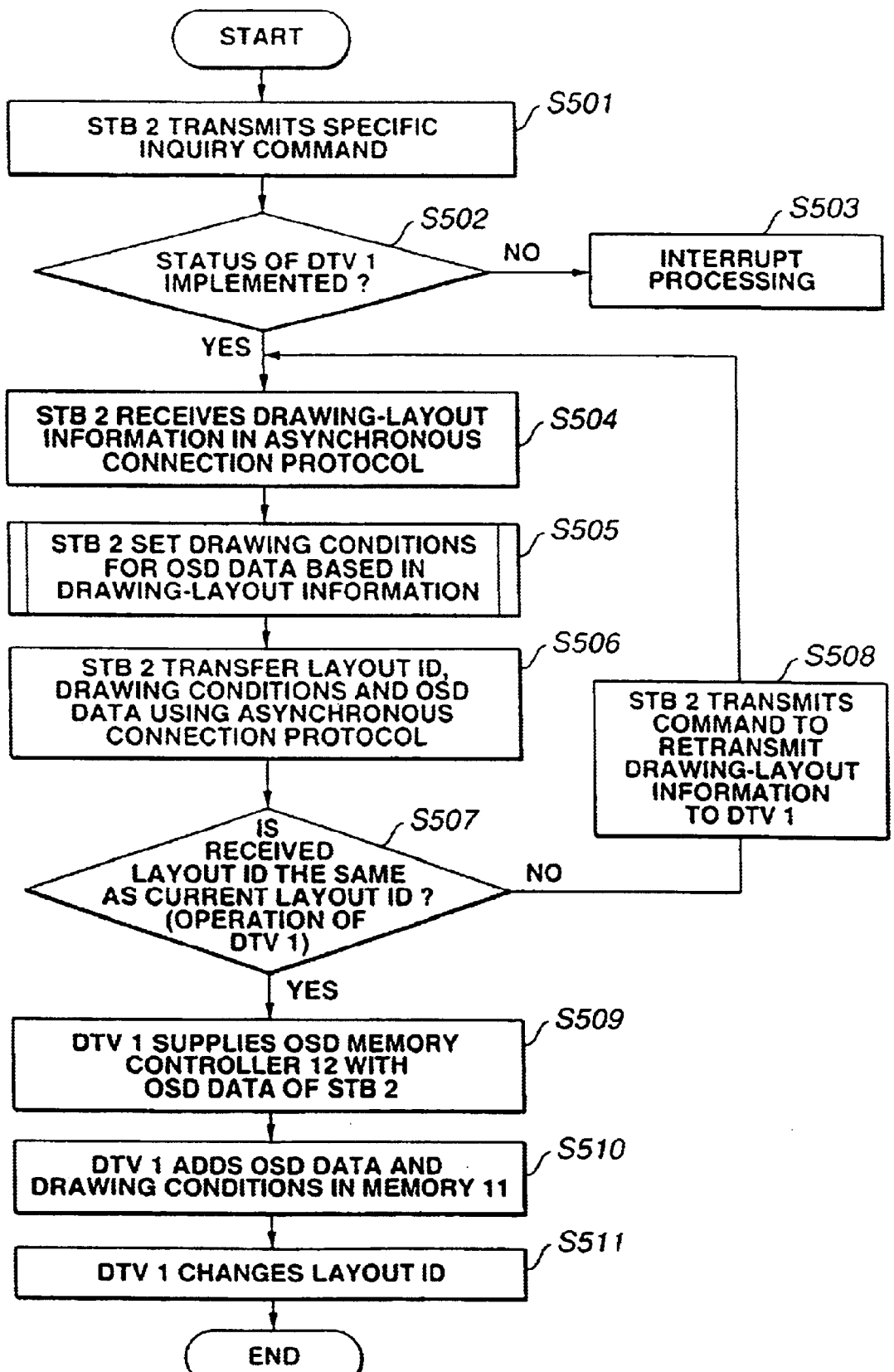
FIG. 5 is a diagram illustrating a transfer procedure.

FIG. 5 is a flowchart illustrating a procedure in which the STB 2 transfers the OSD data of the STB 2 to the DTV 1 using the Asynchronous Connection Protocol.

In step S501, the STB 2 transmits a control command for asking if OSD data can be transmitted/received based on the Asynchronous Connection Protocol, to the DTV 1. More specifically, the STB 2 transmits a "SPECIFIC INQUIRY command" based on the "AV/C digital interface command set specifications" to the DTV 1.

The STB 2 which has received a "SPECIFIC INQUIRY response" corresponding to the SPECIFIC INQUIRY command determines in step S502 if the DTV 1 corresponds to a drawing command set provided in this embodiment.

When the SPECIFIC INQUIRY response indicates "IMPLEMENTED", the STB 2 determines that the DTV 1 corresponds to the drawing command set of the embodiment, and executes processing starting from step S504.

When the SPECIFIC INQUIRY command indicates "NOT IMPLEMENTED", the STB 2 executes the processing of step S503. That is, the STB 2 interrupts drawing processing assuming that the DTV 1 does not have the capability to transmit/receive OSD data, and makes the asynchronous connection plug in a noncontact state.

In step S504, the STB 2 performs asynchronous transfer of a control command for requesting drawing-layout information provided in the DTV 1 to the DTV 1, before transmitting the OSD data. Based on this drawing-layout information, the STB 2 confirms the current state of drawing on the display picture surface of the DTV 1 (i.e., how the DTV 1 displays OSD data from a plurality of other apparatuses).

If the STB 2 requests drawing of the OSD data of the STB 2 without confirming drawing-layout information provided in the DTV 1, there is the possibility that the OSD data of the STB 2 is displayed in a state of being overlapped with OSD data of other apparatuses (nodes) and a part or the entirety of other OSD data cannot be seen. This possibility increases as the number of OSD data currently displayed by the DTV 1 increases, the size of the display area of each OSD data increases, and the size of the display picture surface of the DTV 1 decreases. Accordingly, the STB 2 of this embodiment acquires in advance drawing-layout information of the DTV 1 before transferring the OSD data of the STB 2, and sets optimum drawing conditions for the OSD data based on this drawing-layout information.

This drawing-layout information includes drawing conditions necessary for drawing each OSD data, a layout ID to be provided to each OSD data from the STB 2, and the like. The layout ID is ID information for controlling a change in drawing-layout information of the STB 2, and is also utilized for preventing rewriting of the contents of the drawing-layout information according to a request of drawing from another apparatus, before adding drawing conditions of an apparatus which is currently performing drawing to the drawing-layout information.

The drawing-layout information also includes information relating to the display unit 16 of the DTV 1 (hereinafter termed "display information"). The display information includes at least one of the size of the picture surface of the display unit 16, the type (such as a CRT, a liquid-crystal panel, a plasma display panel or the like) of the display unit 16, the resolution (such as 640×480 pixels, 960×540 pixels or the like) of the display unit 16, a display region where the display unit 16 prohibits drawing of OSD data and the like, a display region where the display unit 16 makes drawing of OSD data and the like effective, the display capability of the display unit 16, and the like.

In step S505, the STB 2 sets optimum drawing conditions for the OSD data based on the drawing-layout information from the DTV 1 and reference drawing conditions requested by the OSD data of the STB 2 (such as the drawing position, the drawing size, overlay conditions, the overlay order, the drawing period, the type of the contents of drawing, the time to start drawing, a period allowed for overlay, and the like). At that time, the STB 2 sets the resolution of the ODS data of the STB 2 to an optimum value based on display information included in the drawing-layout information. Then, the STB 2 generates an OSD frame including at least one subframe using the set drawing conditions, OSD data, layout ID received from the DTV 1, and the like. The data format of the OSD frame will be described later.

In step S506, the STB 2 performs sequential asynchronous transfer of each subframe to the DTV 1 based on the Asynchronous Connection Protocol.

In step S507, the DTV 1 compares the layout ID received from the STB 2 with the layout ID which is currently controlled by the DTV 1.

When the two layout IDs are identical, then, in step S509, the DTV 1 supplies the OSD memory controller 12 with the received OSD data, which stores the supplied data in the OSD memory 13. Then, the OSD memory controller 12 reads the OSD data of the STB 2 from the OSD memory 13, and supplies the read data to the image synthesis unit 15. The image synthesis unit 15 synthesizes this OSD data on the main picture surface according to the drawing conditions.

When the layout ID from the STB 2 differs from the layout ID currently controlled by the DTV 1, then, in step S508, the DTV 1 makes the received OSD data and drawing condition ineffective, and transmits a control command indicating the ineffectiveness to the STB 2.

In step S510, the DTV 1 supplies the drawing-layout memory 11 with the drawing conditions and layout ID of the OSD data of the STB 2 via the drawing-layout control unit 10, in order record the supplied data together with drawing-layout information of other OSD data.

In step S511, the DTV 1 updates the layout ID to another value. The value of the layout ID may be a counter value. The maximum counter value is set to a value larger than the number of apparatuses connected to the network.

According to the above-described processing, the STB 2 can confirm not only the display capability of the DTV 1 but also the layout states of other OSD data displayed on the DTV 1, before transferring predetermined OSD data to the DTV 1, and set optimum drawing conditions in that layout state.

Figure 6:
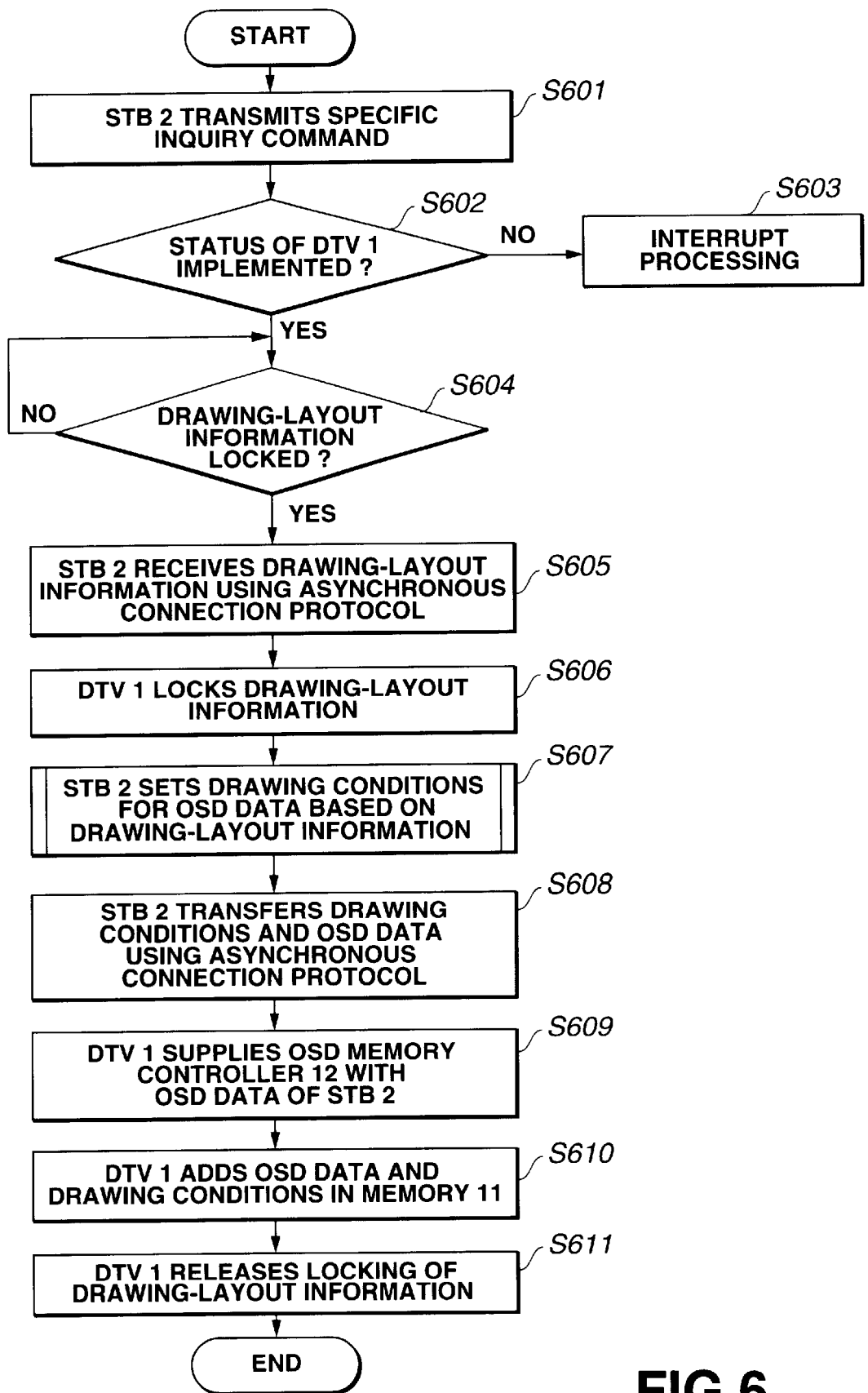
FIG. 6 is a diagram illustrating another transfer procedure.

Although in FIG. 5, the procedure in which the STB 2 transfers the OSD data of the STB 2 to the DTV 1 has been described, the OSD data of the DVCR 3 and the OSD data of the PC 4 may also be transferred according to a procedure shown in FIG. 6.

Another example of the transfer procedure in step S403 shown in FIG. 4 will now be described in detail with reference to FIG. 6.

FIG. 6 is a flowchart illustrating another procedure in which the STB 2 transfers the OSD data of the STB 2 to the DTV 1 using the Asynchronous Connection Protocol.

In step S601, the STB 2 transmits a control command for asking if OSD data can be transmitted/received based on the Asynchronous Connection Protocol, to the DTV 1. More specifically, the STB 2 transmits a SPECIFIC INQUIRY command based on the "AV/C digital interface command set specifications" to the DTV 1.

The STB 2 which has received a SPECIFIC INQUIRY response corresponding to the SPECIFIC INQUIRY command confirms in step S602 if the DTV 1 corresponds to a drawing command set provided by this embodiment.

When the SPECIFIC INQUIRY response indicates "IMPLEMENTED", the STB 2 determines that the DTV 1 corresponds to the drawing command set of the embodiment, and executes processing starting from step S604.

When the SPECIFIC INQUIRY command indicates "NOT IMPLEMENTED", the STB 2 executes the processing of step S603. That is, the STB 2 interrupts drawing processing assuming that the DTV 1 does not have the capability to transmit/receive OSD data, and makes the asynchronous connection plug in a noncontact state.

In step S604, the STB 2 transmits a control command for confirming if the drawing-layout information of the DTV 1 is locked (i.e., if new drawing conditions can be added, or the drawing-layout information can be changed or deleted) to the DTV 1.

When the drawing-layout information is locked, the DTV 1 transmits the value of a lock flag register to the. STB 2 as a response, and repeats the processing of step S604. When the drawing-layout information is not locked, the STB 2 performs processing starting from step S605. The lock flag register is controlled by the drawing-layout control unit 10.

In step S605, the STB 2 performs asynchronous transfer of a control command for requesting drawing-layout information provided in the DTV 1 to the DTV 1 before transmitting OSD data. The STB 2 confirms the current drawing state on the display picture surface of the DTV 1 (i.e., how the DTV 1 displays OSD data from a plurality of other apparatuses) based on this drawing-layout information.

In step S606, the DTV 1 sets the above-described lock flag register until the OSD data of the STB 2 is displayed. By thus setting the lock flag register, the DTV 1 prevents rewriting of the contents of drawing-layout information controlled by the DTV 1 by another apparatus during the period of a series of operations (i.e., a period from the reception of the OSD data to drawing of the received data by the STB 2).

In step S607, the STB 2 sets optimum drawing conditions for the OSD data based on the drawing-layout information from the DTV 1 and reference drawing conditions requested by the OSD data of the STB 2 (such as the drawing position, the drawing size, overlay conditions, the overlay order, the drawing period, the type of the contents of drawing, the time to start drawing, a period allowed for overlay, and the like). At that time, the STB 2 sets the resolution of the OSD data of the STB 2 to an optimum value based on display information included in the drawing-layout information. Then, the STB 2 generates an OSD frame including at least one subframe using the set drawing conditions, OSD data, and the like.

In step S608, the STB 2 performs sequential asynchronous transfer of each subframe to the DTV 1 based on the Asynchronous Connection Protocol.

In step S609, the DTV 1 supplies the OSD memory controller 12 with the received OSD data, which stores the supplied data in the OSD memory 13. Then, the OSD memory controller 12 reads the OSD data of the STB 2 from the OSD memory 13, and supplies the read data to the image synthesis unit 15. The image synthesis unit 15 synthesizes this OSD data on the main picture surface according to the drawing conditions. The display unit 16 displays a picture surface obtained by synthesizing the OSD data of the STB 2.

In step S610, the DTV 1 supplies the drawing-layout memory 11 with the drawing conditions from the STB 2 via the drawing-layout control unit 10, in order to record the supplied data together with drawing-layout information of other OSD data.

In step S611, the DTV 1 releases the locked state of the lock flag register.

According to the above-described processing, the STB 2 can confirm not only the display capability of the DTV 1 but also the layout states of other OSD data displayed on the DTV 1, and set optimum drawing conditions in that layout state.

Although in FIG. 6., the procedure in which the STB 2 transfers OSD data of the STB 2 to the DTV 1 has been described, the OSD data of the DVCR 3 and the OSD data of the PC 4 may also be transferred according to the procedure shown in FIG. 6.

Explanation of the Method for Setting Drawing Conditions

The processing in step S505 shown in FIG. 5 and the processing in step S607 shown in FIG. 6 will now be described in detail with reference to FIG. 7.

Figure 7:
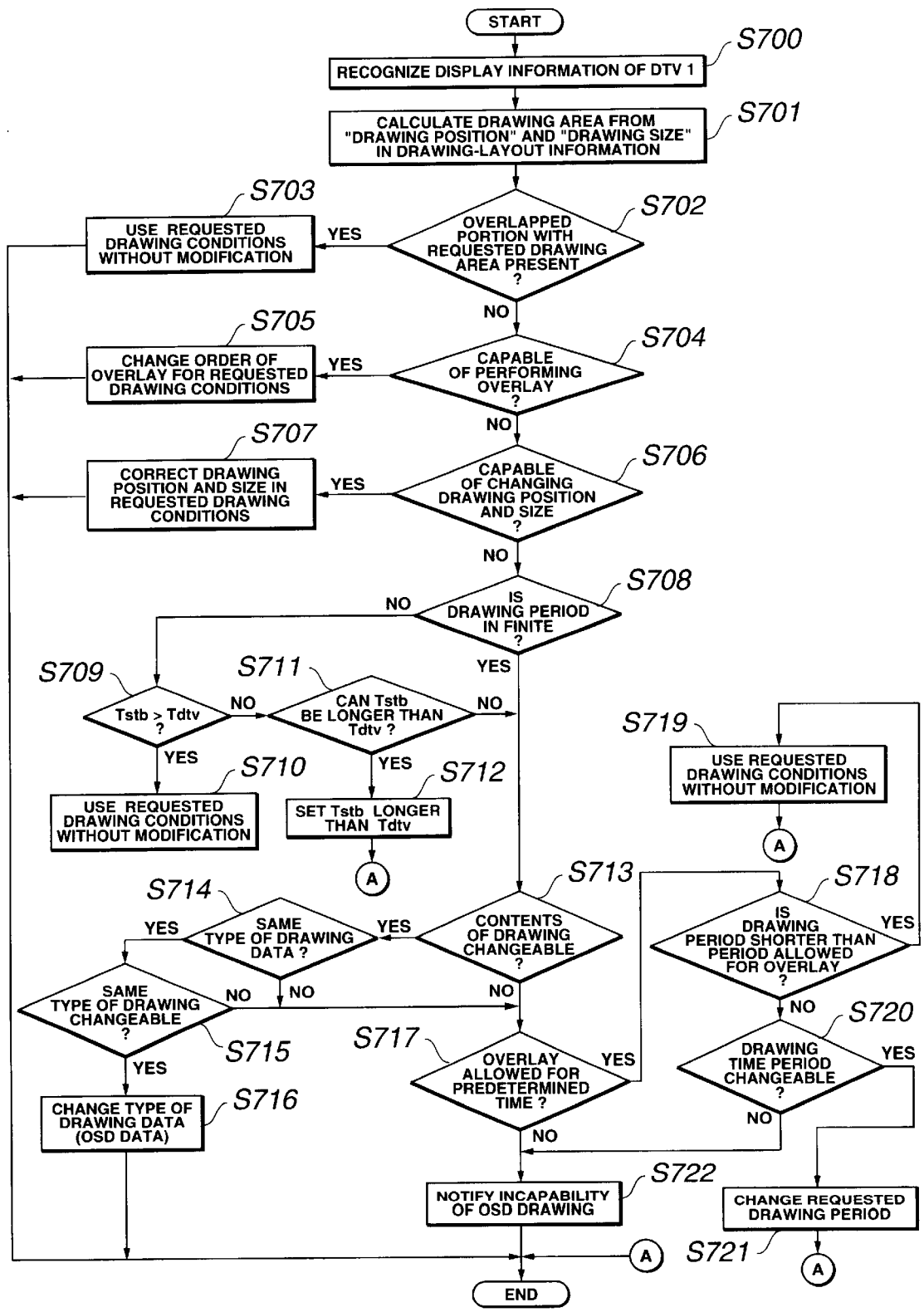
FIG. 7 is a diagram illustrating a procedure for setting drawing conditions for OSD data.

FIG. 7 illustrates the details of a procedure in which the STB 2 sets drawing conditions for the OSD data of the STB 2 based on drawing-layout information controlled by the DTV 1.

In this embodiment, a description will be provided of a case in which drawing conditions for OSD data of each apparatus controlled by the above-described drawing-layout information includes at least following sets of information, i.e., the "drawing position", the "drawing size", "overlay conditions", the "overlay order", the "drawing period", the "type of the contents of drawing", the "time to start drawing" and a "period allowed for overlay". It is assumed that reference drawing conditions requested by the OSD data of the STB 2 also includes the above-described sets of information. Drawing conditions of OSD data drawn by the STB 2 in the past are also included in the drawing-layout information.

In step S700, the STB 2 first detects display information from the drawing-layout information received from the DTV 1. The STB 2 recognizes the size of the picture surface of the display unit 16, the type of the display unit 16, the resolution of the display unit 16, a display region where the display unit 16 prohibits drawing of OSD data and the like, a display region where the display unit 16 makes drawing of OSD data and the like effective, the display capability of the display unit 16, and the like, based on the detected display information, and changes OSD data and drawing conditions of the STB 2. For example, the STB 2 changes the resolution of OSD data of the STB 2 to an appropriate resolution in accordance with the resolution of the display unit 16, changes the size of the OSD data in accordance with the display region where the display unit 16 makes drawing of OSD data and the like effective, or changes the gradation of the OSD data in accordance with the display capability.

In step S701, the STB 2 prepares reference drawing conditions requested by the OSD data of the STB 2. Then, the STB 2 detects the "drawing position" and the "drawing size" of each of other OSD data from the drawing-layout information received from the DTV 1, and calculates the drawing area for OSD data displayed on the DTV 1 using the detected data. The "drawing position" indicates the coordinate value of the upper left corner of the drawing area (converted into a pixel value), and the "drawing size" indicates the width and the height of the drawing area.

Figure 8:
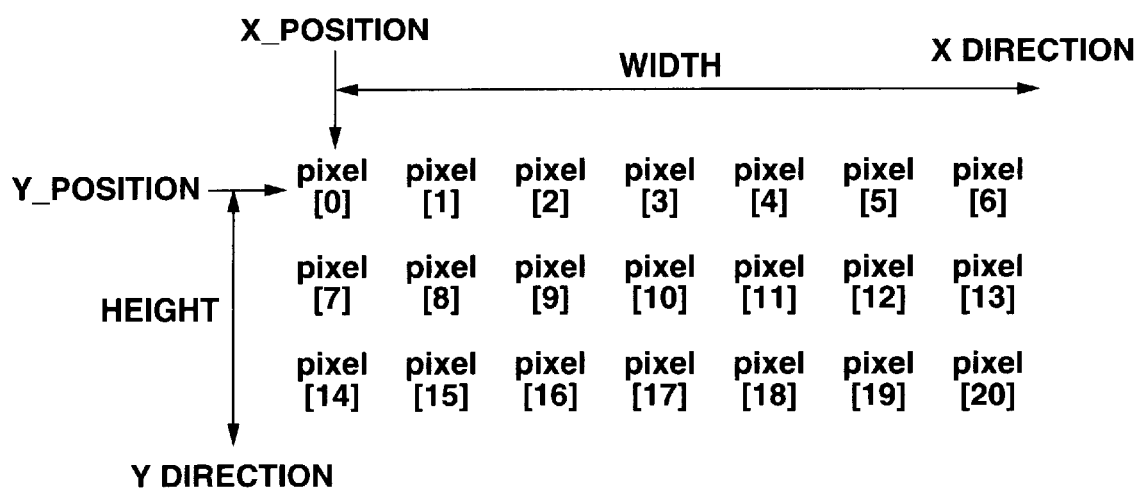
FIG. 8 is a diagram illustrating the relationship between a display picture surface and a drawing area of a digital television apparatus.

The relationship between the display picture surface and the drawing area of the DTV 1 will now be described with reference to FIG. 8. In FIG. 8, a numeral within each [ ] indicates the coordinate value of each pixel, the X direction (X_position) indicates a horizontal direction, and the Y direction (Y_position) indicates a vertical direction. The number of bits of each pixel can be assigned to 4 or 8, and the gradation of the OSD data can be changed in accordance with this assignment.

In step S702, the STB 2 compares the drawing area requested by the OSD data of the STB 2 with the drawing area of other OSD data calculated in step S701, and determines if an overlapped portion is present.

If there is no overlapped portion with other OSD data, then, in step S703, the STB 2 uses the reference drawing conditions requested by the OSD data of the STB 2 without modification.

If there is an overlapped portion with other OSD data, then, in step S704, the STB 2 detects "overlay conditions" of all OSD data which overlap with the OSD data of the STB 2. The "overlap conditions" include, for example, (1) permission of overlay, (2) permission of overlay if the types of OSD data differ from each other (various types are present depending on the contents of drawing), (3) permission of overlay for a predetermined period, and (4) prohibition of overlay.

When the "overlay conditions" of all OSD data within the drawing area satisfy the condition (1), then, in step S705, the STB 2 sets the "overlay order" requested by the OSD of the STB 2 to an order higher than orders for the drawing conditions of these OSD data. In this case, it is possible to display the OSD data of the STB 2 in a state of being superposed with other OSD data.

When the "overlay conditions" of all OSD data satisfy one of the conditions (2)–(4), then, in step S706, the STB 2 determines if the "drawing position" and the "drawing size" requested by the OSD data of the STB 2 can be changed so as not to overlap with other OSD data currently drawn by the DTV 1.

When the drawing position can be moved or the drawing size can be reduced, then, in step S707, the STB 2 corrects the "drawing position" and the "drawing size" of the OSD data of the STB 2, in order to provide new drawing conditions.

When the drawing position and the drawing size cannot be changed, then, in step S708, the STB 2 determines if the "drawing period" requested by the OSD data of the STB 2 is infinite (i.e., if a time to automatically terminate drawing is not set).

If the result of the determination in step S708 is negative, the process proceeds to step S709, where the STB 2 compares the "time to start drawing" (hereinafter termed "tstb") requested by the OSD data of the STB 2 with the "time to end drawing" (hereinafter termed "tsdv") of each of all ODS data overlapping with the OSD data of the STB 2.

When tstb>tdtv as a result of the comparison, then, in step S710, the STB 2 uses the "time to start drawing" requested by the OSD data of the STB 2 as the drawing condition without modification.

When Tstb≦tdtv as a result of the comparison, then, in step S711, the STB 2 determines if the "time to start drawing" can be delayed. If the result of the determination in step S711 is affirmative, the process Proceeds to step S712, where the STB 2 changes the "time to start drawing" of the STB 2 to a time equal to or longer than tdtv, and uses that time as the drawing condition. If the result of the determination in step S711 is negative, the processing of step S713 is executed.

When the "drawing period" requested by the OSD data of the STB 2 is not defined, or when tstb cannot be changed, then, in step S713, the STB 2 determines if the "overlay conditions" of the STB 2 satisfies the condition (2).

If the result of the determination in step S713 is affirmative, the process proceeds to step S714, where the STB 2 determines if the "type of the contents of drawing" of the OSD data of the STB 2 is the same as the "type of the contents of drawing" of other OSD data by comparing them.

If the result of the determination in step S714 is affirmative, the process proceeds to step S715, where the STB 2 determines if the "type of the contents of drawing" of the OSD data of the STB 2 can be changed.

If the result of the determination in step S715 is affirmative, the process proceeds to step S716, where the STB 2 changes the contents of the OSD data of the STB 2 as well as the drawing conditions.

For example, the still image for commercial is changed from a display in the form of a natural picture to a display in the form of graphics or a text, or an EPG is changed from a display in the 3D form to a display in the text form. As a result, for example, even if a plurality of OSDs are subjected to multiplex display, the OSDs can be visually discriminated. A combination of the contents of drawing for allowing overlay is provided in advance.

When the "overlay conditions" of the OSD data of the STB 2 do not satisfy the condition (2) or when the "type of the contents of drawing" cannot be changed, then, in step S717, the STB 2 determines if the "overlay conditions" of the OSD data of the STB 2 satisfy the condition (3).

If the result of the determination in step S717 is affirmative, the process proceeds to step S718, where the STB 2 compares the "drawing period" requested by the OSD data of the STB 2 with the "period allowed for overlay" of each of other OSD data.

When the "drawing period" of the OSD data of the STB 2 is shorter than the "period allowed for overlay" of another OSD data, then, in step S719, the STB 2 uses the drawing conditions requested by the OSD data of the STB 2 as the drawing conditions without modification.

When the "drawing period" of the OSD data of the STB 2 is equal to or longer than the "period allowed for overlay" of another OSD data, then, in step S720, the STB 2 determines if the "drawing period" of the OSD data of the STB 2 can be changed to a period shorter than the "period allowed for overlay".

If the result of the determination in step S720 is affirmative, the process proceeds to step S721, where the STB 2 changes the "drawing period" and uses that period as the drawing condition.

When the "overlay conditions" of the OSD data of the STB 2 do not satisfy the condition (4) or when the "drawing period" cannot be changed, then, in step S722, the STB transfers a control command indicating that the OSD data of the STB 2 cannot be drawn, to the DTV 1.

According to the above-described processing, the STB 2 can compare the drawing conditions requested by the OSD data of the STB 2 with the drawing conditions of other OSD data which have already been drawn, and set optimum drawing conditions, before transferring the OSD data of the STB 2.

Thus, the STB 2 can set drawing conditions so that the OSD data of the STB 2 does not overlap with OSD data of other apparatuses before transferring the OSD data of the STB 2.

In addition, by setting spatial or temporal overlay conditions, the STB 2 can perform drawing within a range of causing no visual problems, even if the drawing area of the OSD data of the STB 2 overlaps with the drawing areas of other apparatuses.

Explanation of the Method for Connecting an Asynchronous Connection Plug

Next, the processing for connecting an asynchronous connection plug in step S402 shown in FIG. 4 will be described in detail with reference to FIG. 9.

Figure 9:
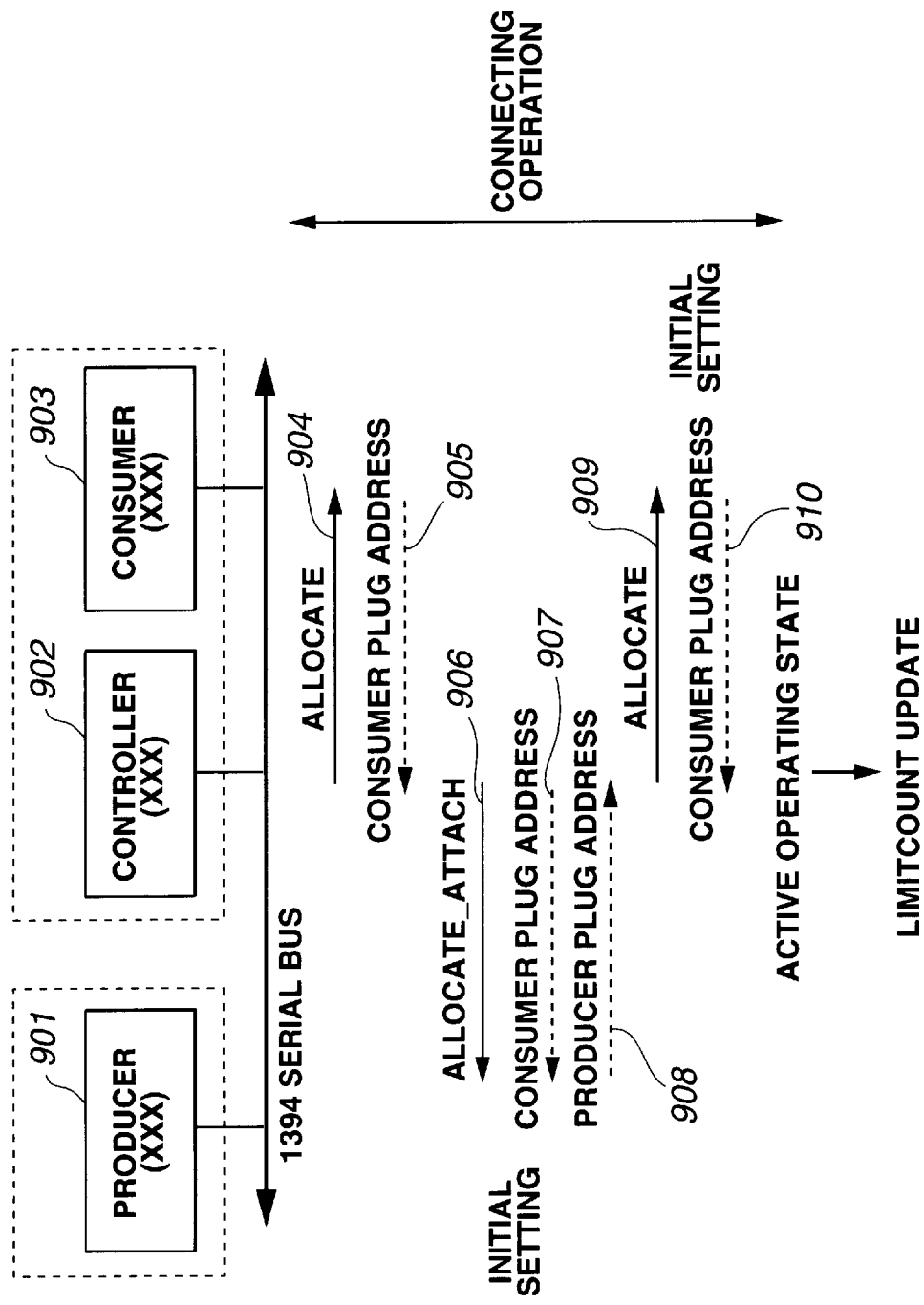
FIG. 9 is a diagram illustrating a procedure for connecting an asynchronous connection plug.

In FIG. 9, the transmission side is called a producer 901, and the reception side is called a consumer 903. An apparatus having the function of setting a logical communication channel between the producer 901 and the consumer 903 and controlling the channel is called a controller 902. The apparatus which serves as the controller 902 may be the producer 901 or the consumer 903, or may be a different apparatus. In FIG. 9, a case in which the same apparatus operates as the controller 902 and the consumer 903 will be described.

When the DTV 1 transfers the above-described drawing-layout information to the STB 2 as in this embodiment, the DTV 1 operates as the producer 901, and the STB 2 operates as the consumer 903. When the STB 2 transfers OSD data and drawing conditions thereof to the DTV 1, the STB 2 operates as the producer 901, and the DTV 1 operates as the consumer 903.

In 904, the controller 902 transmits an "ALLOCATE command" to the consumer 903. The "ALLOCATE" command is a command for allowing a consumer plug resource.

In 905, the consumer 903 transmits a response to the "ALLOCATE command" to the controller 902 (905 shown in FIG. 9). In this response, a "consumer plug address" of the consumer 903 is set.

In 906 and 907, the controller 902 transmits an "ALLOCATE ATTACH command" to the producer 901. The ALLOCATE ATTACH command is a command to allocate the producer plug resource and connect the allocated resource to a consumer plug. In this ALLOCATE ATTACH command, a "consumer plug address" of the consumer 903 is set.

In 908, the producer 901 transmits a response to the ALLOCATE ATTACH command to the controller 902. In this response, a "producer plug address" of the producer 901 is set. According to this ALLOCATE ATTACH command, the producer 901 recognizes the consumer plug address of the consumer 903, and performs initial setting necessary for executing data transfer.

In 909 and 910, the controller 902 transmits an "ATTACH command" to the consumer 903. The ATTACH command is a command to connect a producer plug to a consumer plug. In this ATTACH command, a "producer plug address" of the producer 901 is set. According to the ATTACH command, the consumer 903 recognizes the producer plug address of the producer 901, and performs initial setting necessary for executing data transmission.

According to the above-described procedure, the controller plug 902 can set an asynchronous connection plug (i.e., a consumer plug and a producer plug) which is a virtual input/output plug for the producer 901 (i.e., the DTV 1) and the consumer 903 (i.e., the STB 2). Thus, each apparatus connected to the network of the embodiment can set a logical communication channel and perform data communication via the channel independent of a physical connection state between the producer 901 and the consumer 903.

The above-described various control commands and corresponding responses are subjected to asynchronous transfer in a packet format based on the Functional Control Protocol provided by the IEC (International Electrotechnical Commission) 61883-1 Standards. The Functional Control Protocol will be described later.

Explanation of the Transfer Procedure Based on the Asynchronous Connection Protocol Next, the transfer procedure based on the Asynchronous Connection Protocol will be described in detail with reference to FIG. 10.

Figure 10:
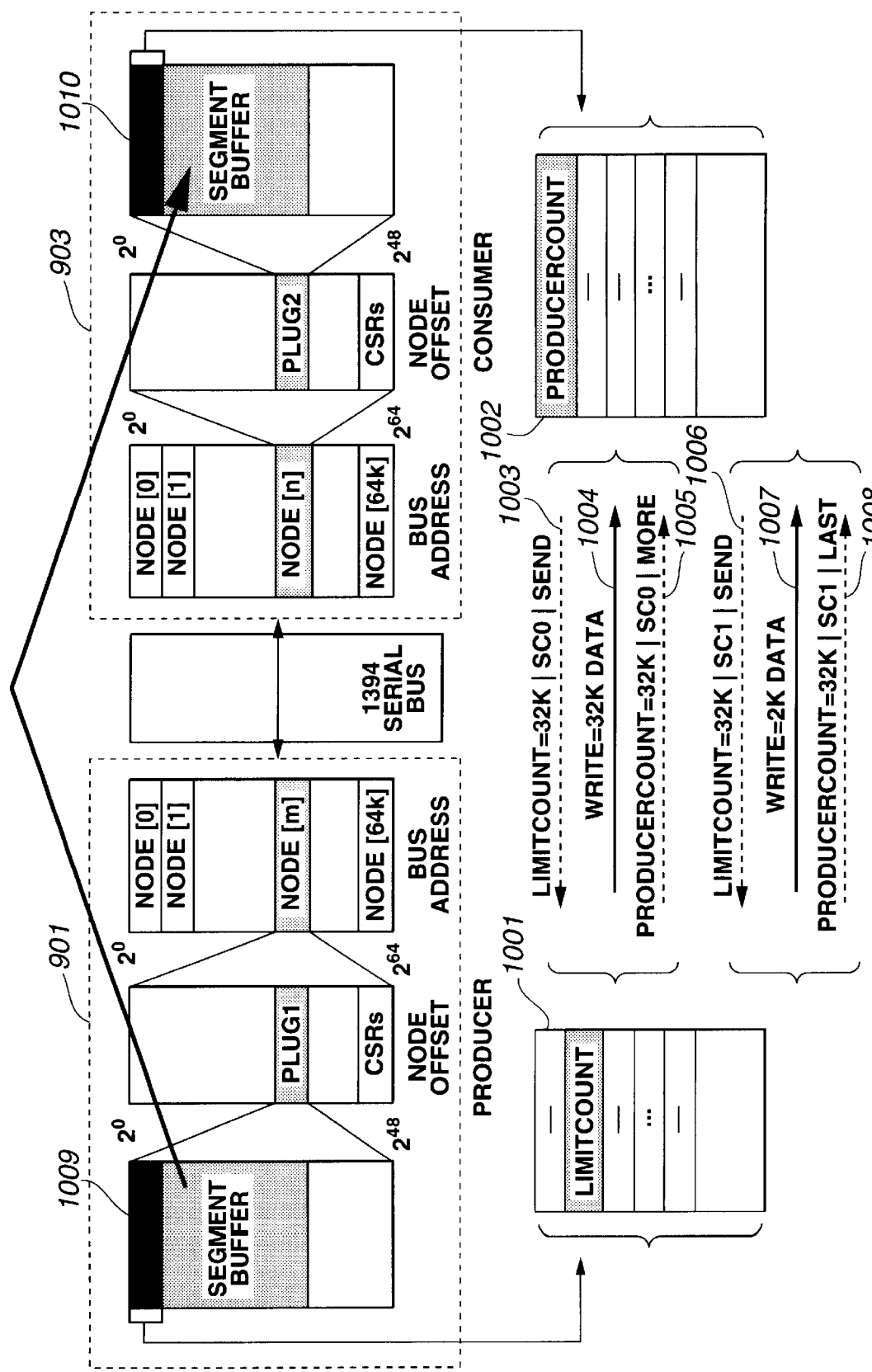
FIG. 10 is a diagram illustrating a transfer procedure based on an Asynchronous Connection Protocol.

As shown in FIG. 10, the producer 901 has a register called a "limit_count 1001" within an address space 1009 of the producer 901. The consumer 903 has at least one "producer_count 1002" within an address space 1010 of the consumer 903. The addresses of respective registers are recognized at the respective registers when connecting an asynchronous connection plug.

The address spaces 1009 and 1010 provided in the respective apparatuses utilize a 64-bit address space provided by the CSR (Control and Status Register Architecture) conforming to IEEE 1212 Standards.

The maximum value of the data size capable of being received by the consumer 903 (or the size of a segment buffer storage provided in the consumer 903) is written in the limit_counter 1001 of the producer 901.

The consumer 903 usually has two segment buffer storages, which are configured so that while data from the producer 901 is written into one of the segment buffer storages, data which has been written is read from another segment buffer storage. In FIG. 10, the two segment buffer storages provided in the consumer 903 are discriminated as "sc0" and "sc1".

The amount of data transferred by the producer 901 is written into the producer_counter 1002 provided in the consumer 903.

Data sequentially read from the segment buffer storage of the producer 901 is subjected to asynchronous transfer to one of the segment buffer storages of the consumer 903. The address of each segment buffer storage is recognized at the respective apparatuses when an asynchronous connection plug is connected. Each segment buffer storage is provided at a predetermined address in the corresponding one of the address spaces 1009 and 1010 provided in the respective apparatuses.

In this embodiment, a data transfer between the producer 901 having 34-KB transfer data (for example, an OSD frame including OSD data and drawing conditions) and the consumer 903 having two 32-KB segment buffer storages will be described with reference to FIG. 10.

An instruction, such as start, continuation, interruption or the like of data transfer, is recognized by the two apparatuses by writing a predetermined value in a "mode" field provided within each of the limit_count 1001 and the producer_count 1002.

FIG. 11 illustrates the types of modes stored in a "mode" field of the limit_count 1001. FIG. 12 illustrates the types of modes stored in a "mode" field of the producer_count 1002.

A communication procedure in this embodiment will now be more specifically described with reference to FIG. 10.

First, in 1003, the consumer 903 writes the data size capable of being received by one segment buffer storage (32 KB in this embodiment), a code for assigning the segment buffer storage (sc0 in this embodiment), and the type of the mode ("SEND(=5) in this embodiment) in the limit_count 1001 of the producer 901. The SEND indicates that the segment buffer storage of the consumer 903 is effective. The "limit_count=32 k|sc0|SEND" shown in FIG. 10 indicates an instruction for the limit_count 1001 of the producer 901 to SEND (transmit) maximum 32-KB data to the 0-th segment buffer storage (sc0).

In 1004, when the producer 901 recognizes that the above-described mode is "SEND", the producer 901 divides the OSD frame to be transmitted into two subframes A (32 KB) and B (2 KB), and performs sequential asynchronous transfer of the subframes A and B.

In 1005, upon completion of the transfer of the subframe A, the producer 901 writes the amount of transmitted data (32 KB in this case), a code for assigning the segment buffer storage (sc0 in this case), and the type of the mode ("MORE (=1)" in this case) in the producer_count 1002 of the consumer 903. The MORE indicates that the transfer of the frame data of the producer 901 is not yet terminated.

In 1006, after recognizing that the transfer of the OSD frame is not yet terminated, the consumer 903 writes the size of received data (32 KB in this embodiment), a code for assigning the next segment buffer storage (sc1 in this embodiment), and the type of the mode ("SEND(=5)" in this embodiment) in the limit_count 1001. At that time, the consumer 903 switches the segment count from sc0 to sc1, and also switches the segment buffer storage for writing transferred data.

In 1007, the producer 901 performs asynchronous transfer of the remaining subframe B (2 KB) to the segment buffer storage of the consumer 903.

In 1008, upon completion of the transfer of the subframe B, the producer 901 writes the amount of transmitted data (2 KB in this case), a code for assigning the segment buffer storage (sc1 in this case), and the type of the mode ("LAST (=4)" in this case) in the producer_count 1002 of the consumer 903. The LAST indicates that the transfer of all OSD frames has been succeeded and another OSD frame is to be transferred.

According to the above-described procedure, each apparatus connected to the network of the embodiment can set the amount of data capable of being transferred at one time to an optimum value in accordance with the reception capability and the transmission capability.

In this embodiment, by using the above-described communication procedure, even a relatively large amount of OSD data can be continuously and assuredly transferred using at least one asynchronous transfer operation.

Explanation of the Data Format of an OSD Frame

Figure 13:
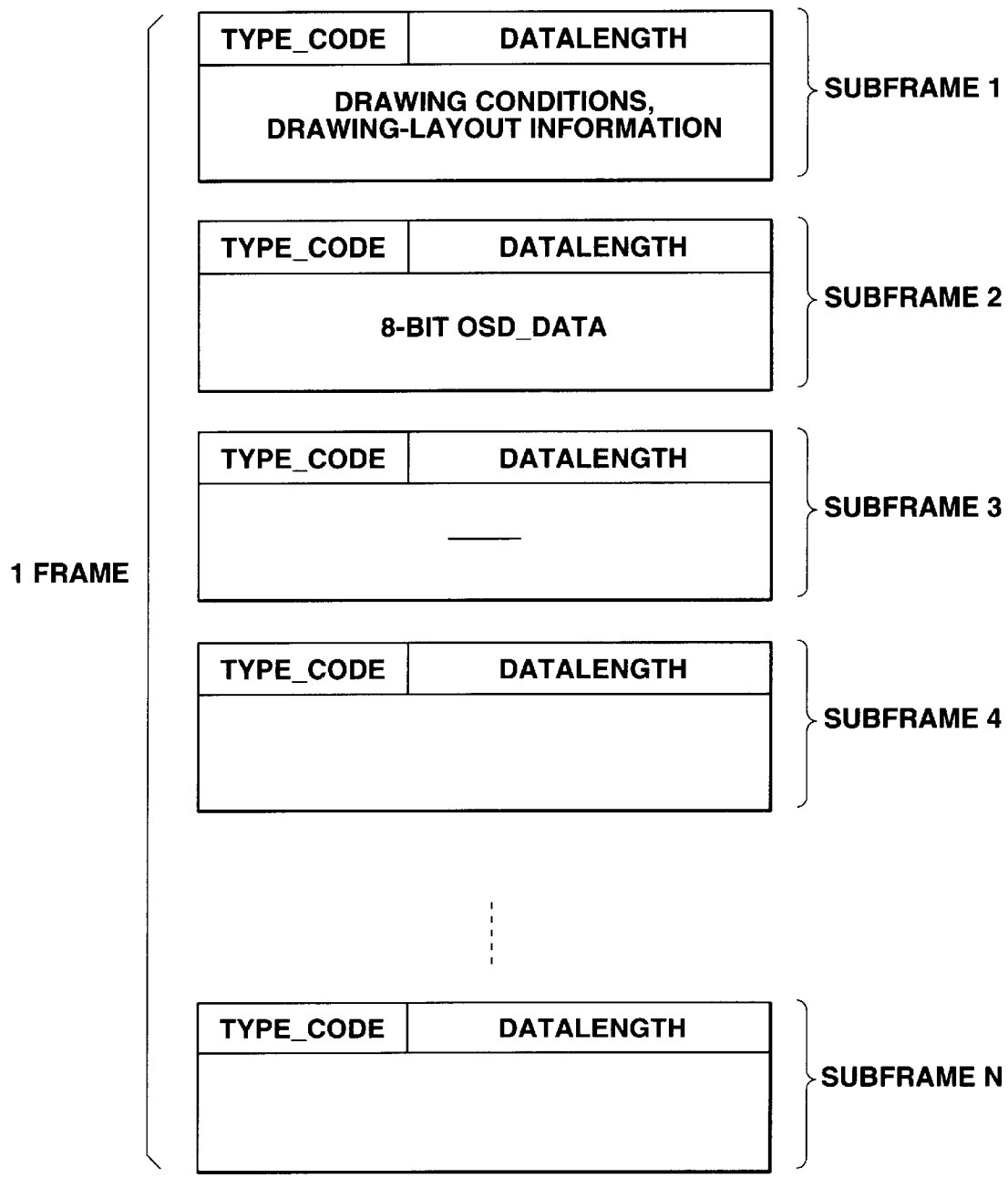
FIG. 13 is a diagram illustrating a data format of a frame.

FIG. 13 is a diagram illustrating a data format of an OSD frame in this embodiment. FIG. 14 is a diagram illustrating the types of type_codes set in each subframe.

As shown in FIG. 13, one OSD frame includes N subframes. A field 1301 for storing a type code and a field 1302 for storing the data length of a data unit are provided in a header unit of each subframe. The consumer 903 can discriminate the type and the contents of each subframe by recognizing the type_code.

For example, when the STB 2 transfers OSD data and drawing conditions in the form of 8 bits/pixel to the DTV 1, the drawing conditions are stored in a subframe 1 shown in FIG. 13, and the OSD data is stored in subframes 2–N shown in FIG. 13. At that time, as shown in FIG. 14, type code="8" (indicating the drawing conditions) is stored in a field 1301 of the subframe 1. As shown in FIG. 14, type_code="3" (indicating the OSD data comprising 8 bits/pixel) is stored in each field 1301 the subframes 2–N.

For example, when the DTV 1 transfers drawing-layout information to the STB 2, drawing conditions for one currently drawn OSD data are stored in the subframe 1 shown in FIG. 13. At that time, as shown in FIG. 14, type_code="7" (indicating drawing-layout information) is stored in the field 1301 of the subframe 1. If the DTV 1 draws a plurality of OSD data, a plurality of subframes are provided. Furthermore, the above-described display information is set in one subframe.

The data size of each subframe can be changed to an optimum size in accordance with the transmission capability and the reception capability of the reception side. Accordingly, it is possible to store drawing conditions for a plurality of OSD data in a single subframe, and also to store drawing conditions for one OSD data in a plurality of subframes.

Figure 15:
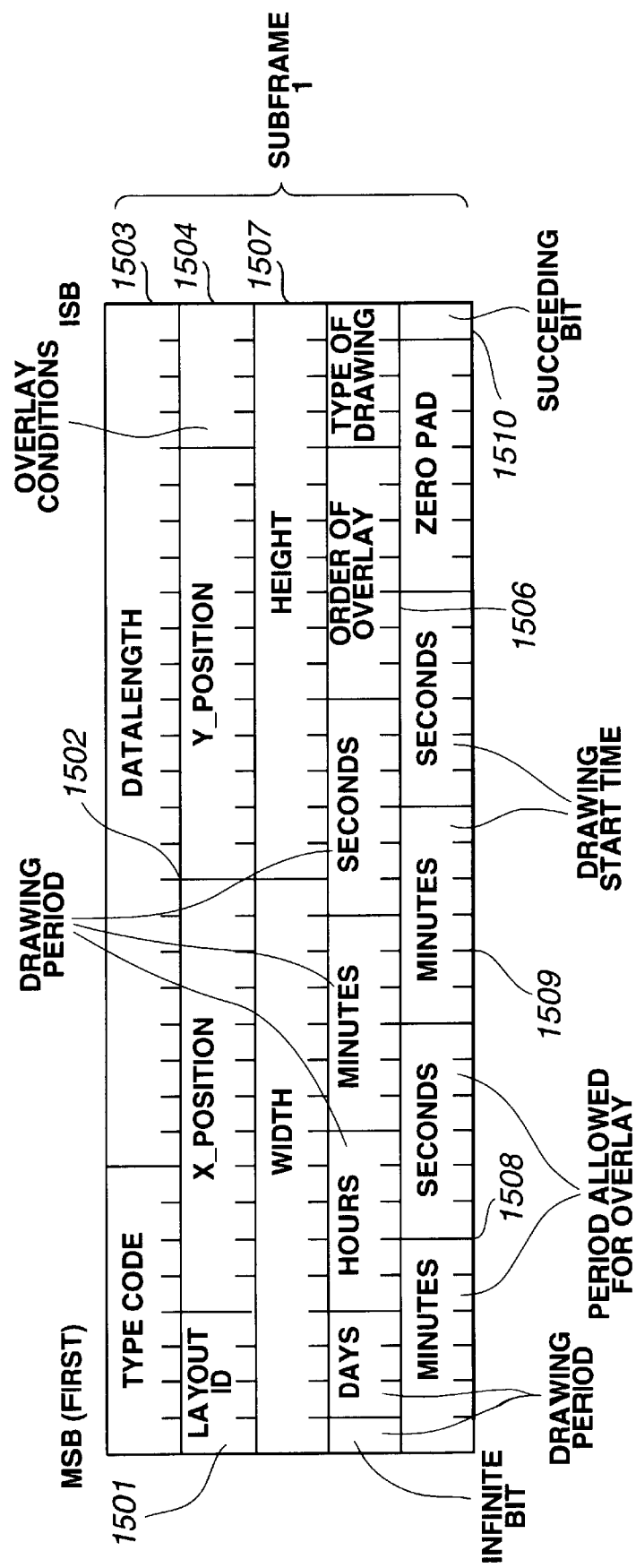
FIG. 15 is a diagram illustrating a data format of a subframe.

FIG. 15 is a diagram illustrating a data format of the subframe of the embodiment in detail. In FIG. 15, a description will be provided of the configuration of the subframe for storing drawing conditions for OSD data.

In FIG. 15, a field 1501 indicates "layout ID". The field 1501 is used for identifying a plurality of OSD data. A field 1502 indicates the "drawing position". The coordinate value (represented by the X_position and the Y_position) of the upper left corner of a region where OSD data is to be drawn is stored in the field 1502.

A field 1503 indicates the "overlay conditions". A value indicating the above-described overlay conditions is stored in the field 1503. A field 1504 indicates the "drawing size". A value indicating the size of a region where the OSD data is to be drawn (represented by the width and the height) is stored in the field 1504.

A field 1505 indicates the "drawing period". A value indicating a period for drawing the OSD data (represented by "unlimited", or by assignment of the date and time). When an "infinite bit" is set, it indicates that a period for automatically terminating drawing is not defined. A field 1506 indicates the "overlay order". The order for overlay of the OSD data is stored in the field 1506.

A field 1507 indicates the "type of the contents of drawing". A value indicating the type of OSD data which can be changed is stored in the field 1507. A field 1508 indicates the "period allowed for overlay". A value indicating the period allowed for overlay of OSD data (represented in units of a minute and a second) is stored in the field 1508.

A field 1509 indicates the "time to start drawing". A value indicating the time to start drawing OSD data (represented in units of a minute and a second) is stored in the field 1509. A field 1510 indicates a "succeeding bit". When the field 1510 is set, it indicates that the next subframe is present.

Explanation of the Functional Control Protocol

Each apparatus constituting the data communication system of the embodiment transfers various control commands and corresponding responses based on the Functional Control Protocol (hereinafter abbreviated as the "FCP"). A control command in the above-described Asynchronous Connection Protocol is also transferred based on the FCP.

The basic operation of the FCP will now be described with reference to FIG. 16. The FCP is provided in the IEC 61883-1 (General) Standards.

Figure 16:
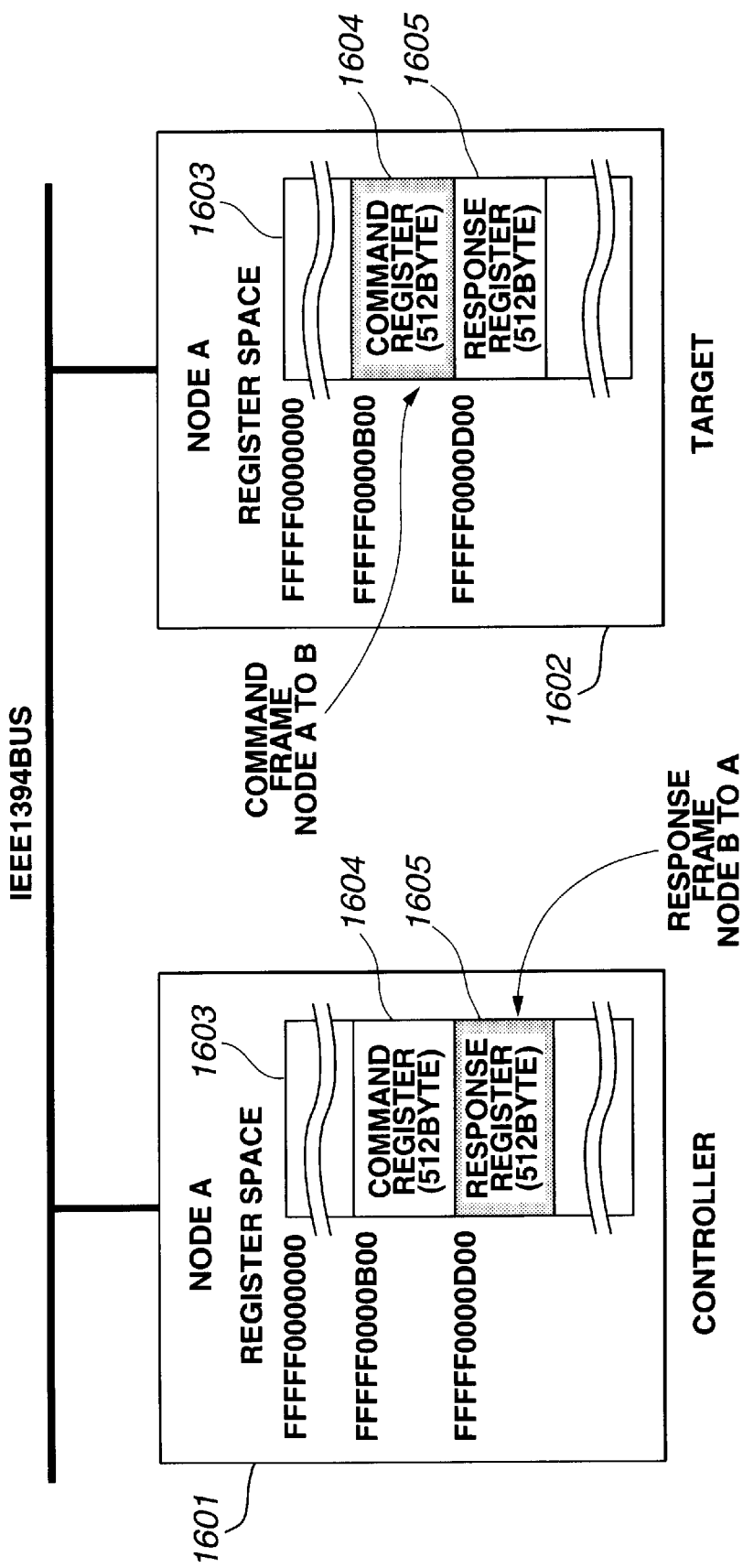
FIG. 16 is a diagram illustrating the basic operation of a Functional Control Protocol.

In FIG. 16, reference numeral 1601 represents a control node (a controller), and reference numeral 1602 represents a node to be controlled (a target). For example, in this embodiment, the STB 2 and the DTV 1 operate as the control node 1601 and the node to be controlled 1602, respectively.

The FCP provides a region 1604 called a "command register" and a region 1605 called a "response register" in a part of a register space 1603 provided in each of the control node 1601 and the node to be controlled 1602. The register space 1603 is included within a 64-bit address space provided by the IEEE 1394-1995 Standards.

As shown in FIG. 6, a region from address 0xFFFFF0000B00 to address 0xFFFFF0000CFF in the register space 1603 is allocated to the command register 1604, and a region from address 0xFFFFF0000D00 to address 0xFFFFF0000EFF in the register space 1603 is allocated to the response register 1605.

The control node 1601 writes a "command frame" into the command register 1604 of the node to be controlled 1602 using Asynchronous Write Transaction of the IEEE 1394-1995 Standards. The command frame is one of FCP frames provided by the FCP.

The node to be controlled 1602 writes a "response frame" into the response register 1605 of the control node 1601 using Asynchronous Write Transaction of the IEEE 1394-

1995 Standards. The response frame is one of FCP frames provided by the FCP.

Figure 17A:
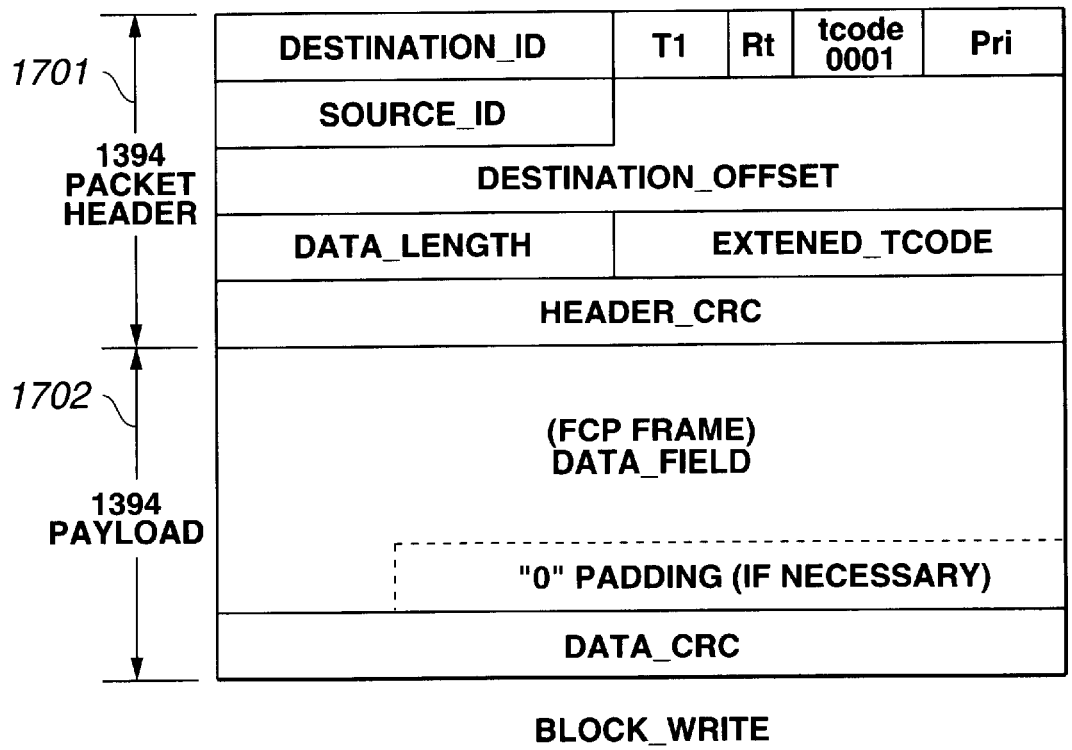
FIGS. 17A and 17B are diagrams illustrating packet formats provided by the Functional Control Protocol.
Figure 17B:
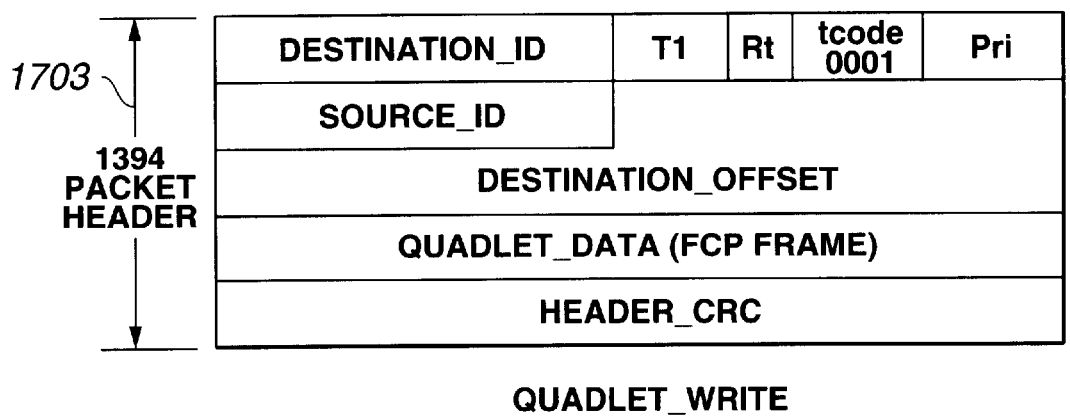

FIGS. 17A and 17B are diagrams, each illustrating a packet format provided by the FCP. In the FCP, various FCP frames are transferred based on the asynchronous write transaction packet of the IEEE 1394-1995 Standards. In the IEC 1883-1 Standards, only the data format of the FCP frame is provided. Data to be set in the data format differs depending on a higher layer which uses the data.

FIG. 17A is a diagram illustrating the format of the asynchronous write transaction packet configured by an FCP frame having a size larger than 1 quadlet (32 bits).

In FIG. 17A, data conforming to the Asynchronous Write Transaction of the IEEE 1394-1995 Standards is set in a header portion 1701 of the asynchronous packet. An FCP frame is set in a data portion (payload) 1702. One FCP frame comprises 512 bytes at maximum.

FIG. 17B is a diagram illustrating the format of the asynchronous write transaction packet configured by an FCP frame having the size of 1 quadlet.

In FIG. 17B, the FCP frame is stored in a field 1504 of a header portion 1503.

Figures 18, 19:
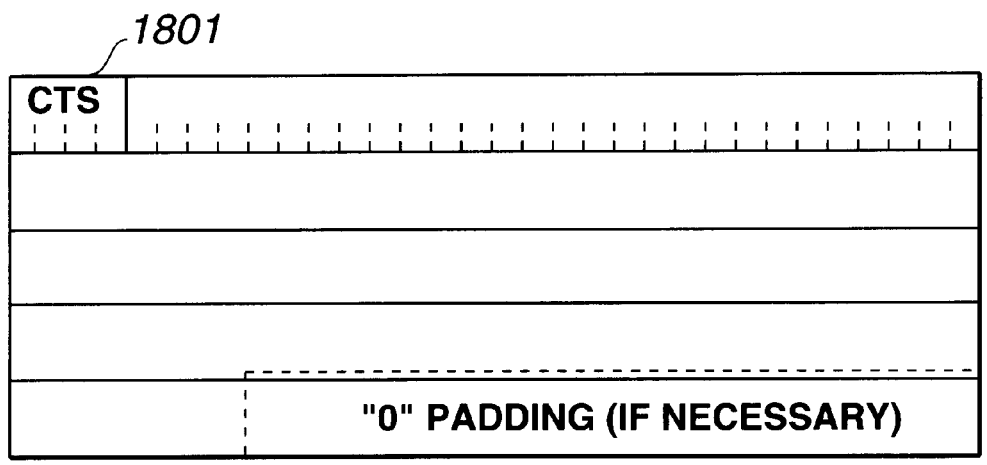
FIG. 18 is a diagram illustrating a data format of an FCP (Functional Connection Protocol) frame.
FIG. 19 is a diagram illustrating the types of "cts"s.

FIG. 18 is a diagram illustrating the data format of the above-described FCP frame.

As described above, the FCP frames include the command frame and the response frame.

As shown in FIG. 18, in the IEC 61883-1 Standards, only the first 4-bit field (cts) 1801 of the FCP frame is provided.

The cts (command/transaction set) is used for identifying a higher layer conforming to the FCP. The cts defines the type of the command set, the detailed data format of the command frame/response frame, and the rule for transaction for transferring the command frame/response frame, which differ depending on the higher layer.

FIG. 19 is a diagram illustrating the types of the currently provided cts's and corresponding values. In FIG. 19, cts= "0000" is a value indicating an AV/C (audio video/control) digital interface command set used in this embodiment. Some other higher layers than the one shown in FIG. 19 are prepared.

Explanation of the AV/C Digital Interface Command Set

Next, a description will be provided of the AV/C digital interface command set (hereinafter abbreviated as the "AV/C command set"), serving as a higher layer conforming to the above-described FCP, used in this embodiment. The AV/C command set defines a command/transaction set for controlling communication using isochronous transfer, and the operations of AV apparatuses, such as televisions, monitors, video recorders, stereophonic apparatuses and the like, in detail.

The basic operation of the AV/C command set is started by transmitting a command frame based on the AV/C command set from the control node (controller) 1601 to the node to be controlled (target) 1602. Then, the node to be controlled 1602 completes processing by transmitting a response frame corresponding to this command frame to the control node 1601.

Figure 20:
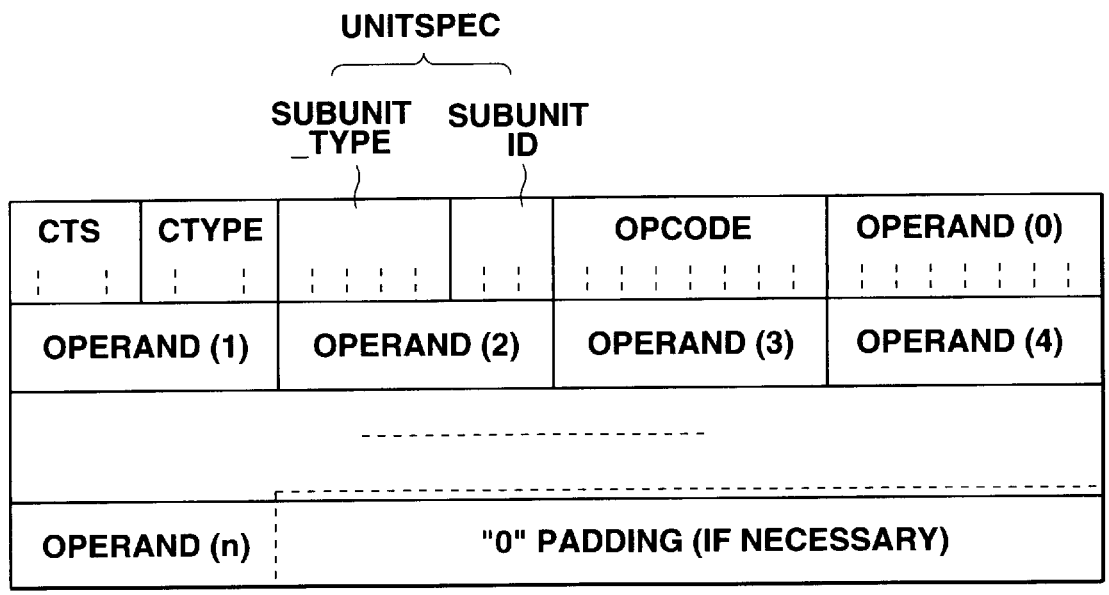
FIG. 20 is a diagram illustrating the data format of a command frame.
Figure 21:
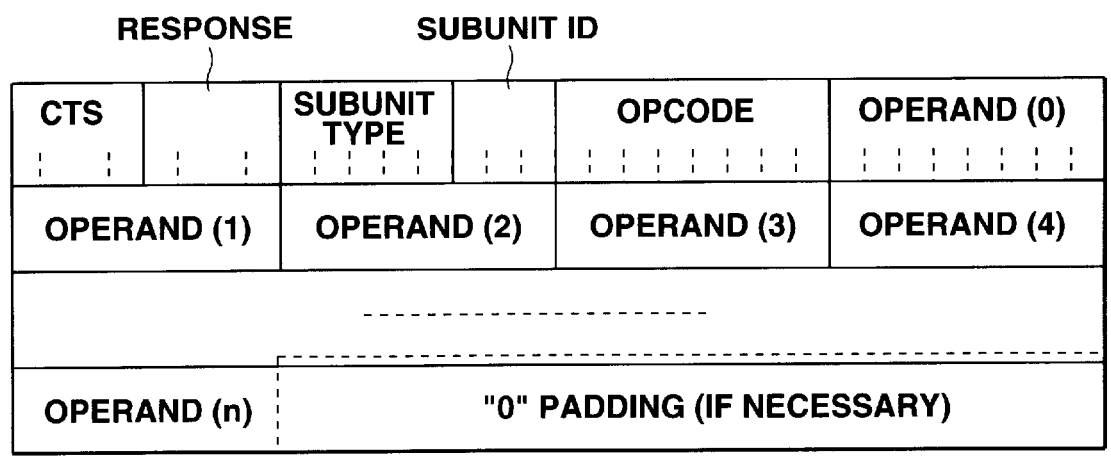
FIG. 21 is a diagram illustrating the data format of a response frame.

FIG. 20 is a diagram illustrating the data format of the above-described command frame generated based on the AV/C command set. FIG. 21 is a diagram illustrating the data format of the above-described response frame generated based on the AV/C command set.

The command frame shown in FIG. 20 includes respective fields for cts, ctype (response), subunit_type, subunit_ID, opcode, operand (0)–operand (n). In the response frame shown in FIG. 21, each field other than a "response" field is the same as in the command frame.

A value indicating the AV/C command set, i.e., "0000", stored in the cts field (4 bits).

A code indicating the type of the control command (ctype) is stored in a ctype (command type) field (4 bits). The ctype will now be described with reference to FIG. 22.

In FIG. 22, a value "0h" represents "CONTROL", which is a ctype for requesting the node to be controlled 1602 to perform a predetermined operation. For example, in this embodiment, the "CONTROL" is used when the STB 2 requests drawing-layout information to the DTV 1.

A value "1h" represents "STATUS", which is a ctype for asking the current state of the node to be controlled 1602.

A value "2h" represents "SPECIFIC INQUIRY", which is a ctype for asking if the node to be controlled 1602 supports a predetermined control command. In this embodiment, the SPECIFIC INQUIRY is used for determining if the DTV 1 corresponds to the drawing command set of the embodiment.

A value "3h" represents "NOTIFY", which is a ctype indicating a desire to know a future change in the state of the node to be controlled 1602. Upon reception of this control command, the node to be controlled 1602 first transmits a response indicating the current state, and transmits a response indicating a new state after a change in the state.

A value "4h" represents "GENERAL SPECIFIC INQUIRY", which is a ctype for asking if the node to be controlled 1602 supports a predetermined control command, using an opcode field.

Values "5h"–"7h" are reserved.

Values "8h"–"Fh" are used in a response frame (to be described below).

Next, a description will be provided of a code set in a response field (a response code) with reference to FIG. 23. Each response code indicates a result of execution for a control command.

In FIG. 23, values "0h"–"7h" are used in the above-described ctype.

A value "8h" represents "NOT IMPLEMENTED", which is a response code indicating that the received control command is not supported.

A value "9h" represents "ACCEPTED", which is a response code indicating execution of the received control command.

A value "Ah" represents "REJECTED", which is a response code indicating that, although the received control command is supported, it cannot be executed at present.

A value "Bh" represents "IN TRANSMISSION", which is a response code indicating that the state is in transition (for example, when a control command which has been received in the past is being executed).

A value "Ch" is a response code representing "IMPLEMENTED/STABLE".

A value "Dh" represents "CHANGED", which is a response code indicating the final response corresponding to the above-described NOTIFY command. A response frame including this response code is transmitted to the control node 1601 when the state of the node to be controlled 1602 has changed.

A value "Eh" is reserved.

A value "Fh" is a response code representing "INTERIM".

An opcode (i.e., 26h) indicating the Asynchronous Connection Protocol is stored in an opcode field shown in FIGS. 20 and 21.

A control command for requesting a specific processing operation, such as an ALLOCATE command, an ATTCH command or the like, to the node to be controlled 1602 is set in an operand (0) field.

The above-described consumer plug addresses and producer plug addresses are stored in operand (2)–operand (7) fields, and operand (9)–operand (10) fields.

The individual components shown in outline or designated by blocks in the drawings are all well known in the data communication apparatus and method arts and their specific construction and operation are not critical to the operation or the best mode for carrying out the invention.

The invention may be embodied in other specific forms without departing from the spirit or essential characteristics thereof.

For example, although in this embodiment, the case in which a single display device (the DTV 1) is connected to the network has been described, the number of the display device is not limited to one. A plurality of display devices may also be connected.

Although in this embodiment, a digital television receiver has been illustrated as an example of the display device, the display device is not limited to the digital television receiver. Any other display device, such as the PC 4 or the like, may also be used, provided that the functions of the above-described embodiment can be realized.

Although in this embodiment, a set-top box has been illustrated as an example of the AV apparatus which supplies the display device with display information, the present invention is not limited to the set-top box. Any other apparatus, such as the DVCR 3, the PC 4, a camcorder (a video camera incorporating a VCR), a digital camera, a printer, a scanner or the like may also be used, provided that the functions of the above-described embodiment can be realized.

Therefore, the above-mentioned embodiment is merely an example in all respects, and must not be construed to limit the invention. The scope of the present invention is defined by the scope of the appended claims, and is not limited at all by the specific descriptions of this specification. Furthermore, all the modifications and changes belonging to equivalents of the claims are considered to fall within the scope of the present invention.

What is claimed is:

1. A receiving apparatus, comprising:
    a communication unit that receives first display information from a first device and receives second display information and control information from a second device;
    a display unit that displays the first display information and the second display information on a display; and
    a control unit that generates control information for minimizing overlay of the first display information and the second display information, wherein
        said communication unit receives the control information from said control unit and sends, before receiving the second display information from the second device, the control information from said control unit to the second device.

2. A receiving apparatus according to claim 1, wherein the control information includes at least one of first information indicating a position to display the first display information and second information indicating a size of the first display information.

3. A receiving apparatus according to claim 2, wherein the control information also includes at least one of third information indicating a period for displaying the first display information and fourth information indicating a time to display the first display information.

4. A receiving apparatus according to claim 1, wherein the second display information is a user interface for remotely controlling the second device.

5. A receiving apparatus according to claim 1, wherein the communication unit is conformed to IEEE 1394-1995 standard.

6. A receiving apparatus according to claim 1, wherein the receiving apparatus is a digital television.

7. A method for a receiving apparatus that receives first display information from a first device and receives second display information and control information from a second device, and displays the first display information and the second display information on a display unit, the method comprising the steps of:
    generating control information for minimizing overlay of the first display information and the second display information; and
    before the receiving apparatus receives the second display information from the second device, sending the generated control information to the second device.

8. A method according to claim 7, wherein the control information includes at least one of first information indicating a position to display the first display information and second information indicating a size of the first display information.

9. A method according to claim 8, wherein the control information also includes at least one of third information indicating a period for displaying the first display information and fourth information indicating a time to display the first display information.

10. A method according to claim 7, wherein the second display information is a user interface for remotely controlling the second device.

11. A method according to claim 7, wherein the receiving apparatus including a communication unit conforming to IEEE 1394-1995 standard.

12. A method according to claim 7, wherein the receiving apparatus is a digital television.

* * * * *

UNITED STATES PATENT AND TRADEMARK OFFICE
CERTIFICATE OF CORRECTION

PATENT NO. : 6,839,071 B1
DATED : January 4, 2005
INVENTOR(S) : Katsuhiro Miyamoto It is certified that error appears in the above-identified patent and that said Letters Patent is hereby corrected as shown below:

Drawings,
Sheet 16, FIG. 17A, "EXTENED_TCODE" should read -- EXTEND _TCODE --.
Sheet 19, FIG. 22, "COMMANED" should read -- COMMAND -- and "INQUIR Y" should read -- INQUIRY --; and FIG. 23, "COMMANED" should read
-- COMMAND --.

Column 1,
Line 20, "a." should read -- a --.

Column 9,
Line 44, "ODS data" should read -- OSD data --.

Column 10,
Line 58, "to the." should read -- to the --.

Column 13,
Line 26, "all ODS" should read -- all OSD --.

Column 16,
Line 43, ""SEND(=5)" should read -- ("SEND(=5)" --.

Column 17,
Line 31, "type code" should read -- type_code --.
Line 40, "type code="8"" should read -- type_code="8" --.

UNITED STATES PATENT AND TRADEMARK OFFICE
CERTIFICATE OF CORRECTION

PATENT NO. : 6,839,071 B1
DATED : January 4, 2005
INVENTOR(S) : Katsuhiro Miyamoto It is certified that error appears in the above-identified patent and that said Letters Patent is hereby corrected as shown below:

Column 21,
Line 5, "ATTCH" should read -- ATTACH --.

Signed and Sealed this

Eighteenth Day of April, 2006

JON W. DUDAS
*Director of the United States Patent and Trademark Office*